US011039399B2

(12) United States Patent
Lei et al.

(10) Patent No.: US 11,039,399 B2
(45) Date of Patent: Jun. 15, 2021

(54) OPEN LOOP POWER CONTROL FOR TWO-STEP RANDOM ACCESS

(71) Applicant: QUALCOMM Incorporated, San Diego, CA (US)

(72) Inventors: Jing Lei, San Diego, CA (US); Jay Kumar Sundararajan, San Diego, CA (US); Linhai He, San Diego, CA (US); Seyong Park, San Diego, CA (US); Yi Huang, San Diego, CA (US); Hung Dinh Ly, San Diego, CA (US); Tingfang Ji, San Diego, CA (US); Joseph Binamira Soriaga, San Diego, CA (US); Naga Bhushan, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/735,318

(22) Filed: Jan. 6, 2020

(65) Prior Publication Data

US 2020/0252880 A1 Aug. 6, 2020

Related U.S. Application Data

(60) Provisional application No. 62/801,527, filed on Feb. 5, 2019.

(51) Int. Cl.
*H04W 52/14* (2009.01)
*H04W 74/08* (2009.01)
(Continued)

(52) U.S. Cl.
CPC ......... *H04W 52/143* (2013.01); *H04L 1/0003* (2013.01); *H04L 5/005* (2013.01);
(Continued)

(58) Field of Classification Search
CPC ......... H04W 72/0446; H04W 72/1257; H04W 72/042; H04W 72/0453; H04L 5/001;
(Continued)

(56) References Cited

U.S. PATENT DOCUMENTS

2010/0172299 A1 7/2010 Fischer et al.
2013/0258862 A1 10/2013 Dinan
(Continued)

OTHER PUBLICATIONS

International Search Report and Written Opinion—PCT/US2020/012606—ISA/EPO—dated Apr. 7, 2020.
(Continued)

*Primary Examiner* — Anez C Ebrahim
(74) *Attorney, Agent, or Firm* — Qualcomm Incorporated

(57) ABSTRACT

Methods, systems, and devices for wireless communications are described. A user equipment (UE) may receive system information from a base station indicating at least one configuration rule for power control parameter setting for random access. The UE may measure one or more reference signals and may estimate a path loss of wireless communications between the base station and the UE based on the measured reference signals. The UE may select one or more parameters from one or more sets of parameters indicated in the configuration rule. The UE may select a first transmit power for a preamble of a random access message and a second transmit power for a payload of the random access message, based on the estimated path loss and the configuration rule for power control parameters and power ramping procedures. The UE may transmit the random access message according to the selected first and second transmit powers.

31 Claims, 17 Drawing Sheets

(51) Int. Cl.
*H04W 52/24* (2009.01)
*H04L 5/00* (2006.01)
*H04W 52/10* (2009.01)
*H04W 72/04* (2009.01)
*H04W 76/27* (2018.01)
*H04W 52/36* (2009.01)
*H04W 24/08* (2009.01)
*H04L 1/00* (2006.01)

(52) U.S. Cl.
CPC ........... *H04W 24/08* (2013.01); *H04W 52/10* (2013.01); *H04W 52/242* (2013.01); *H04W 52/36* (2013.01); *H04W 72/0473* (2013.01); *H04W 74/0833* (2013.01); *H04W 76/27* (2018.02)

(58) Field of Classification Search
CPC ....... H04L 5/22; H04L 5/0005; H04L 5/1469; H04L 5/26; H04L 5/14; H04B 7/2615
See application file for complete search history.

(56) References Cited

U.S. PATENT DOCUMENTS

| | | | | |
|---|---|---|---|---|
| 2015/0334686 | A1 | 11/2015 | Ji et al. | |
| 2016/0073431 | A1* | 3/2016 | Park .................. | H04W 72/1284 370/329 |
| 2017/0332407 | A1* | 11/2017 | Islam .................... | H04W 52/42 |

OTHER PUBLICATIONS

LG Electronics: Remaining Details on Supplementary UL in NR LTE Coexistence, 3GPP Draft, 3GPP TSG RAN WG1 Meeting #90, R1-1713221 Remaining Details on Supplementary UL in NR LTE Coexistence, 3rd Generation Partnership Project (3GPP), Mobile Competence Centre, 650, Route Des Lucioles, F-06921 Sophia-Antip, vol. RAN WG1, No. Prague, Czech Republic, Aug. 21, 2017-Aug. 25, 2017, Aug. 20, 2017 (Aug. 20, 2017), XP051316029, 4 Pages, Retrieved from the Internet: URL: http://www.3gpp.org/ftp/Meetings_3GPP_SYNC/RAN1/Docs/, [retrieved on Aug. 20, 2017], p. 2.

Qualcomm Incorporated: "Summary of Maintenance for PRACH Procedure", 3GPP Draft, 3GPP TSG-RAN WG1 94bis, R1-1811931, 3rd Generation Partnership Project (3GPP), Mobile Competence Centre, 650, Route Des Lucioles, F-06921 Sophia-Antipolis Cedex, France, vol. RAN WG1, No. Chengdu, China, Oct. 8, 2018-Oct. 12, 2018, Oct. 10, 2018 (Oct. 10, 2018), XP051519255, 23 Pages, Retrieved from the Internet: URL: http://www.3gpp.org/ftp/tsg%5Fran/WG1%5FRL1/TSGR1%5F94b/Docs/R1%2D1811931%2Ezip, [retrieved on Oct. 10, 2018], Section 0.5.1, p. 3, Section 7-8, p. 12-p. 14, Section 9, p. 15.

RAN1: "[Draft] LS on PRACH Power Control", 3GPP Draft, 3GPP TSG RAN WG1#54, R1-083269, 3rd Generation Partnership Project (3GPP), Mobile Competence Centre, 650, Route Des Lucioles, F-06921 Sophia-Antipolis Cedex, France, No. Jeju, Aug. 18, 2008-Aug. 22, 2008, Aug. 25, 2008 (Aug. 25, 2008), XP050316677, 2 Pages, [retrieved on Aug. 25, 2008], Section 1, p. 1.

ZTE, et al., "New work item: 2-step RACH for NR", 3GPP Draft, 3GPP TSG RAN Meeting #82, RP-182894 New Work Item Proposal 2 Step RACH for NR, 3rd Generation Partnership Project (3GPP), Mobile Competence Centre, 650, Route Des Lucioles, F-06921 Sophia-Antipolis Cedex, France, vol. TSG RAN, No. Sorrento, Italy, Dec. 10, 2018-Dec. 13, 2018, Dec. 13, 2018 (Dec. 13, 2018), XP051575527, 5 pages, Retrieved from the Internet: URL: http://www.3gpp.org/ftp/tsg%5Fran/TSG%5FRAN/TSGR%5F82/Docs/RP%2D182894%2Ezip. [retrieved on Dec. 13, 2018], Section 3, Section 4.1.

* cited by examiner

OPEN LOOP POWER CONTROL FOR TWO-STEP RANDOM ACCESS

CROSS REFERENCE

The present Application for Patent claims the benefit of U.S. Provisional Patent Application No. 62/801,527 by LEI et al., entitled "OPEN LOOP POWER CONTROL FOR TWO-STEP RANDOM ACCESS," filed Feb. 5, 2019, assigned to the assignee hereof, and expressly incorporated herein.

BACKGROUND

The following relates generally to wireless communications, and more specifically to open loop power control for two-step random access.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include a number of base stations or network access nodes, each simultaneously supporting communication for multiple communication devices, which may be otherwise known as user equipment (UE).

SUMMARY

The described techniques relate to improved methods, systems, devices, and apparatuses that support open loop power control for two-step random access. Generally, a user equipment (UE) may receive system information from a base station, the system information indicating at least one configuration rule for power control parameter setting for random access. The UE may measure one or more reference signals (e.g., as indicated by the system information). The UE may estimate a path loss of wireless communications between the base station and the UE based on the measured reference signals. The UE may select one or more parameters from one or more sets of parameters indicated in the configuration rule. The UE may select a first transmit power for a preamble portion of a random access message and a second transmit power for a payload portion of the random access message, based on the estimated path loss. The UE may transmit the random access message according to the selected first and second transmit powers.

A method of wireless communications at a UE is described. The method may include obtaining system information received from a base station, the system information including an indication of at least one configuration rule for power control parameter setting for random access, estimating a path loss of wireless communications between the base station and the UE based on one or more reference signals, selecting, based on the estimated path loss and the at least one configuration rule for power control parameter setting, a first transmit power for a first portion of a random access message and a second transmit power for a second portion of the random access message, and outputting the first portion of the random access message and the second portion of the random access message for transmission according to the first transmit power and the second transmit power.

An apparatus for wireless communications at a UE is described. The apparatus may include a processor, memory in electronic communication with the processor, and instructions stored in the memory. The instructions may be executable by the processor to cause the apparatus to obtain system information received from a base station, the system information including an indication of at least one configuration rule for power control parameter setting for random access, estimate a path loss of wireless communications between the base station and the UE based on one or more reference signals, select, based on the estimated path loss and the at least one configuration rule for power control parameter setting, a first transmit power for a first portion of a random access message and a second transmit power for a second portion of the random access message, and output the first portion of the random access message and the second portion of the random access message for transmission according to the first transmit power and the second transmit power.

Another apparatus for wireless communications at a UE is described. The apparatus may include means for obtaining system information received from a base station, the system information including an indication of at least one configuration rule for power control parameter setting for random access, estimating a path loss of wireless communications between the base station and the UE based on one or more reference signals, selecting, based on the estimated path loss and the at least one configuration rule for power control parameter setting, a first transmit power for a first portion of a random access message and a second transmit power for a second portion of the random access message, and outputting the first portion of the random access message and the second portion of the random access message for transmission according to the first transmit power and the second transmit power.

A non-transitory computer-readable medium storing code for wireless communications at a UE is described. The code may include instructions executable by a processor to obtain system information received from a base station, the system information including an indication of at least one configuration rule for power control parameter setting for random access, estimate a path loss of wireless communications between the base station and the UE based on one or more reference signals, select, based on the estimated path loss and the at least one configuration rule for power control parameter setting, a first transmit power for a first portion of a random access message and a second transmit power for a second portion of the random access message, and output the first portion of the random access message and the second portion of the random access message for transmission according to the first transmit power and the second transmit power.

Some examples of the method, apparatuses, and non-transitory computer-readable medium described herein may further include operations, features, means, or instructions for selecting a first path loss compensation factor value of the set of path loss compensation factor values for the first portion of the random access message and a second path loss compensation factor value of the set of path loss compensation factor values for the second portion of the random access message, the selecting based on the estimated path loss, where selecting the first transmit power may be based on the first path loss compensation factor value and selecting the second transmit power may be based on the second path loss compensation factor value.

In some examples of the method, apparatuses, and non-transitory computer-readable medium described herein, the first path loss compensation factor value may be different than the second path loss compensation factor value.

Some examples of the method, apparatuses, and non-transitory computer-readable medium described herein may further include operations, features, means, or instructions for identifying a first bandwidth and a first numerology for the first portion of the random access message and a second bandwidth and a second numerology for the second portion of the random access message, where selecting the first transmit power and the second transmit power may be based on the first bandwidth and the second bandwidth.

Some examples of the method, apparatuses, and non-transitory computer-readable medium described herein may further include operations, features, means, or instructions for identifying a first beam corresponding to the first portion of the random access message and a second beam corresponding to the second portion of the random access message, where selecting the first transmit power and the second transmit power may be based on a beamforming scheme of the first beam and a beamforming scheme of the second beam.

Some examples of the method, apparatuses, and non-transitory computer-readable medium described herein may further include operations, features, means, or instructions for selecting a first target received power value for the first portion of the random access message and selecting a second target received power value for the second portion of the random access message, based on the set of target received power values, where selecting the first transmit power may be based on the first target received power value and selecting the second transmit power may be based on the second target received power value.

In some examples of the method, apparatuses, and non-transitory computer-readable medium described herein, the first target received power value may be different than the second target received power value.

Some examples of the method, apparatuses, and non-transitory computer-readable medium described herein may further include operations, features, means, or instructions for identifying a payload size or a modulation and coding scheme (MCS) of the second portion of the random access message, where selecting the second transmit power may be based on the identified payload size or the MCS of the second portion of the random access message.

Some examples of the method, apparatuses, and non-transitory computer-readable medium described herein may further include operations, features, means, or instructions for identifying a radio resource control (RRC) state for the UE, where identifying the payload size of the second portion of the random access message may be based on the identified RRC state.

Some examples of the method, apparatuses, and non-transitory computer-readable medium described herein may further include operations, features, means, or instructions for monitoring, based on the random access message, for a response message from the base station, determining, based on the monitoring, that at least the first portion of the random access message or the second portion of the random access message may have failed, and initiating, based on the at least one configuration rule for power control parameter setting and the determining, a power ramping procedure for the first portion of the random access message or the second portion of the random access message.

Some examples of the method, apparatuses, and non-transitory computer-readable medium described herein may further include operations, features, means, or instructions for monitoring, based on the random access message, for a response message from the base station, determining, based on the monitoring, that the random access message may have failed, and initiating, based on the at least one configuration rule for power control parameter setting and the determining, a first power ramping procedure for the first portion of the random access message and a second power ramping procedure for the second portion of the random access message.

Some examples of the method, apparatuses, and non-transitory computer-readable medium described herein may further include operations, features, means, or instructions for selecting, based on the estimated path loss, a first set of resources for transmitting the first portion of the random access message and a second set of resources for transmitting the second portion of the random access message, where the first set of resources corresponds to a group of UEs, and where the second set of resources corresponds to one of a first subset of UEs from the group of UEs, and the second set of resources corresponds to a second subset of UEs from the group of UEs.

Some examples of the method, apparatuses, and non-transitory computer-readable medium described herein may further include operations, features, means, or instructions for selecting a sequence for transmitting the first portion of the random access message based on the estimated path loss and the first set of resources.

Some examples of the method, apparatuses, and non-transitory computer-readable medium described herein may further include operations, features, means, or instructions for selecting the sequence for transmitting the first portion of the random access message may be based on a comparison of the estimated path loss to a threshold.

Some examples of the method, apparatuses, and non-transitory computer-readable medium described herein may further include operations, features, means, or instructions for obtaining the threshold based on the system information received from the base station.

In some examples of the method, apparatuses, and non-transitory computer-readable medium described herein, each UE of the first subset of UEs may have a first path loss that satisfies the threshold, and where each UE of the second subset of UEs may have a second path loss that does not satisfy the threshold.

Some examples of the method, apparatuses, and non-transitory computer-readable medium described herein may further include operations, features, means, or instructions for selecting the first set of resources and the second set of resources may be based on a comparison of the estimated path loss to a threshold.

In some examples of the method, apparatuses, and non-transitory computer-readable medium described herein, estimating the path loss of wireless communications between the base station and UE based on one or more reference signals further may include operations, features, means, or instructions for obtaining an indication of a set of reference signal types on which to perform measurements based on the system information received from the base station, and performing the measurements on the set of reference signal types based on the obtained indication, where estimating the path loss may be based on a combination of the measurements.

Some examples of the method, apparatuses, and non-transitory computer-readable medium described herein may further include operations, features, means, or instructions for estimating the path loss based on an average value of the performed measurements.

Some examples of the method, apparatuses, and non-transitory computer-readable medium described herein may further include operations, features, means, or instructions for obtaining, based on the system information received from the base station, a set of weighted values corresponding to the set of reference signal types, applying the set of weighted values to the performed measurements, and estimating the path loss based on the weighted performed measurements.

In some examples of the method, apparatuses, and non-transitory computer-readable medium described herein, the set of reference signal types includes a synchronization signal block (SSB), a system information block (SIB), a downlink positioning reference signal (PRS), a channel state information reference signal (CSI-RS), or a combination thereof.

Some examples of the method, apparatuses, and non-transitory computer-readable medium described herein may further include operations, features, means, or instructions for identifying a first component carrier and a second component carrier, where the set of reference signal types may be received on the first component carrier, receiving a second set of reference signals on the second component carrier, performing a second set of measurements on the second set of reference signals, and where estimating the path loss on the first component carrier may be based on the second set of measurements.

In some examples of the method, apparatuses, and non-transitory computer-readable medium described herein, the system information may be received via a master information block (MIB), a remaining minimum system information (RMSI) message, an SIB, or a combination thereof.

A method of wireless communications at a base station is described. The method may include configuring at least one configuration rule for power control parameter setting for random access signaling from a UE, outputting system information for transmission to the UE, the system information including an indication of the at least one configuration rule for power control parameter setting for random access, and obtaining a random access message received from the UE, the random access message having a first portion and a second portion, where the first portion of the random access message is obtained according to a first transmit power and the second portion of the random access message is obtained according to a second transmit power.

An apparatus for wireless communications at a base station is described. The apparatus may include a processor, memory in electronic communication with the processor, and instructions stored in the memory. The instructions may be executable by the processor to cause the apparatus to configure at least one configuration rule for power control parameter setting for random access signaling from a UE, output system information for transmission to the UE, the system information including an indication of the at least one configuration rule for power control parameter setting for random access, and obtain a random access message received from the UE, the random access message having a first portion and a second portion, where the first portion of the random access message is obtained according to a first transmit power and the second portion of the random access message is obtained according to a second transmit power.

Another apparatus for wireless communications at a base station is described. The apparatus may include means for configuring at least one configuration rule for power control parameter setting for random access signaling from a UE, outputting system information for transmission to the UE, the system information including an indication of the at least one configuration rule for power control parameter setting for random access, and obtaining a random access message received from the UE, the random access message having a first portion and a second portion, where the first portion of the random access message is obtained according to a first transmit power and the second portion of the random access message is obtained according to a second transmit power.

A non-transitory computer-readable medium storing code for wireless communications at a base station is described. The code may include instructions executable by a processor to configure at least one configuration rule for power control parameter setting for random access signaling from a UE, output system information for transmission to the UE, the system information including an indication of the at least one configuration rule for power control parameter setting for random access, and obtain a random access message received from the UE, the random access message having a first portion and a second portion, where the first portion of the random access message is obtained according to a first transmit power and the second portion of the random access message is obtained according to a second transmit power.

In some examples of the method, apparatuses, and non-transitory computer-readable medium described herein, the at least one configuration rule for power control parameter setting indicates a set of path loss compensation factor values.

In some examples of the method, apparatuses, and non-transitory computer-readable medium described herein, the at least one configuration rule for power control parameter setting indicates a set of target received power values.

Some examples of the method, apparatuses, and non-transitory computer-readable medium described herein may further include operations, features, means, or instructions for outputting, for transmission to the UE, a response message for a successfully decoded random access message within a preconfigured time window.

Some examples of the method, apparatuses, and non-transitory computer-readable medium described herein may further include operations, features, means, or instructions for obtaining the first portion of the random access message over a first set of resources, and obtaining the second portion of the random access message over a second set of resources, where the first set of resources corresponds to a group of UEs, and where the second set of resources corresponds to one of a first subset of UEs from the group of UEs, and the second set of resources corresponds to a second subset of UEs from the group of UEs.

Some examples of the method, apparatuses, and non-transitory computer-readable medium described herein may further include operations, features, means, or instructions for outputting, for transmission to the UE in the system information, a path loss threshold, where the first portion of the random access message and the second portion of the random access message may be received over the first set of resources and the second set of resources based on whether a path loss between the base station and the UE satisfies the path loss threshold.

In some examples of the method, apparatuses, and non-transitory computer-readable medium described herein, each UE of the first subset of UEs may have a first path loss that satisfies the path loss threshold, and where each UE of the second subset of UEs may have a second path loss that does not satisfy the path loss threshold.

Some examples of the method, apparatuses, and non-transitory computer-readable medium described herein may further include operations, features, means, or instructions for configuring a set of reference signal types on which the UE may perform the measurements, and outputting, for transmission to the UE, an indication of the set of reference signal types in the system information.

Some examples of the method, apparatuses, and non-transitory computer-readable medium described herein may further include operations, features, means, or instructions for outputting, for transmission to the UE in the system information, a set of weighted values corresponding to the set of reference signal types.

In some examples of the method, apparatuses, and non-transitory computer-readable medium described herein, the set of reference signal types includes an SSB, an SIB, a downlink PRS, a CSI-RS, or a combination thereof.

In some examples of the method, apparatuses, and non-transitory computer-readable medium described herein, the system information may be received via an MIB, an RMSI message, an SIB, or a combination thereof.

DETAILED DESCRIPTION

Figure 1:
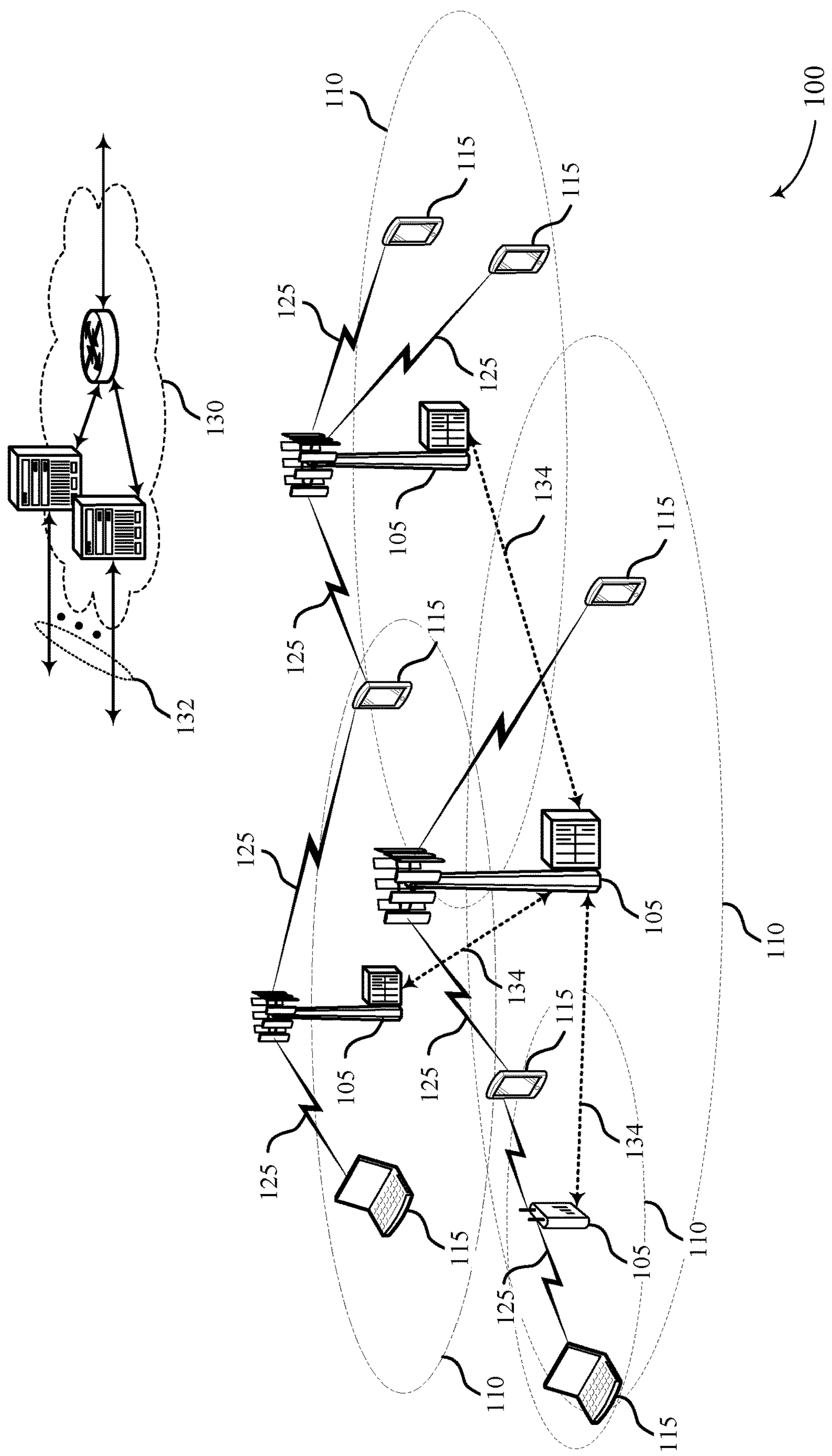
FIG. 1 illustrates an example of a system for wireless communications that supports open loop power control for two-step random access in accordance with aspects of the present disclosure.

Some wireless systems support establishment of communications between a user equipment (UE) and a base station using a random access procedure that may enable a UE to synchronize with the base station. For example, the UE may initiate the random access procedure when it is first powered on (e.g., at initial access), during a handover of the UE from one base station to another base station, when the UE needs to re-establish communications after an interruption, or under various other conditions. The random access procedure may involve a series of handshake messages between the UE and the base station. In some cases, it may be desirable to reduce the latency associated with the random access procedure. Further, conventional approaches to random access procedures may not account for near-far effects, multi-user interference, and efficiency for retransmission of handshake messages.

In a four-message random access procedure, the first message (e.g., message 1) may be a message transmitted from the UE to the base station and may include a preamble waveform (e.g., a preamble sequence) that identifies the UE. The UE may transmit message 1 employing open loop power control. The second message (e.g., message 2) may be transmitted from the base station to the UE and may acknowledge receipt of the preamble and allocate transmission resources to the UE. The third message (e.g., message 3) may be another message transmitted from the UE to the base station and may include a request for a radio resource control (RRC) connection. The UE may transmit message 3 employing closed loop power control. The fourth message may be transmitted from the base station to the UE and may include an RRC connection response. Once the fourth message is received and decoded by the UE, the UE may begin communications with the base station in, for example, RRC connected mode. This random access procedure may be referred to as a four-step random access procedure. In some examples, resources may be allocated for message 3 transmissions from multiple UEs, and the allocated resources may be orthogonalized. Because each UE uses orthogonalized sets of resources for transmitting message 3, the UE may not consider intra-cell interference incurred by other UEs when calculating a target received power for a physical uplink shared channel transmission in a four-step random access procedure.

In some cases, a four-step random access procedure may be inefficient (e.g., may introduce latency to the communication system). A more efficient random access procedure may improve communication efficiency and may be particularly useful for latency-sensitive communications.

A UE and a base station may perform a two-step random access procedure that includes transmission of a first message (message A) from the UE to the base station and a second message (message B) from the base station to the UE. In some cases, these two messages may essentially replace the four messages of a conventional four-step random access procedure.

In some cases, message A of the two-step random access procedure may include a preamble portion and a payload portion (which may be, for example, an RRC connection request or data), thereby combining features of the first message and the third message of a conventional four-step procedure. In some cases, the base station may respond with a downlink response. This downlink response may be referred to as message B of the two-step random access procedure. A UE may transmit message A without first receiving an uplink grant from a base station. The resources allocated for transmitting message A may be shared by multiple UEs in a non-orthogonal manner. This may lead to intra-cell interference that may affect power control procedures for sending message A. In some examples, different payload sizes or different modulation and coding schemes (MCS) may be supported by different RRC states. That is, the payload portion of a message A may have different sizes for different RRC states (e.g., idle, active, connected, etc.), which may affect a power control procedures for sending message A. In some cases, when message A is not successfully received by a base station (e.g., when a UE does not receive message B within a threshold amount of time) the UE may select a power ramping procedure to resend message A. However, open loop power ramping procedures conventionally used for sending message 1 and the closed loop power ramping procedures used for sending message 3 or a conventional four-step random access procedure may not be suitable for message A of a two-step random access procedure.

A UE may select transmit power for sending the preamble and payload of message A using one or more open loop power control procedures for a two-step random access procedure. The UE may obtain system information from a base station (e.g., a system information block (SIB), master information block (MIB), remaining minimum system information (RMSI), or the like). The system information may indicate one or more configuration rules for power control parameter setting. That is, the one or more configuration rules may include one or more sets of parameters (e.g., a set of target received power values, a set of path loss compensation factor values, or the like), and the UE may select a value for each parameter of the sets of received parameters and calculate a transmit power based thereon. In some examples, the UE may measure one or more reference signals and may estimate path loss between the base station and the UE. The UE may select the one or more parameters based on the estimated path loss. In some examples, the UE may calculate a first transmit power for the preamble portion of message A, and may calculate a second transmit power for the payload portion of message A. The UE may select different resources on which to transmit the preamble portion of message A and the payload portion of message A. The selected resources may be based on the estimated path loss. Additionally, the UE may calculate the first and second transmit powers based on one or more of cell size, RRC states, bandwidth and numerology for the preamble and the payload of message A, respectively, and transmit beams for sending the preamble and the payload of message A. If an initial transmission of message A fails, then the UE may apply different power ramping procedures to the preamble portion of message A and the payload portion of message A.

Particular aspects of the subject matter described herein may be implemented to realize one or more advantages. The described techniques may support improvements in spectral efficiency of a two-step random access procedure by accounting for near-far effects and multi-user interference. In some examples, implementations of the present disclosure may enable a device to determine a transmit power (e.g., initiate a power ramping procedure) for the preamble portion of message A or the payload portion of message A, or both. In some specific implementations, the device may employ different transmit powers or different power ramping procedures for each of the preamble portion of message A and the payload portion of message A based on the channel characteristics (e.g., the path loss) associated with the device. Such implementations may increase efficiency for the retransmission of the preamble portion and the payload portion, which may potentially result in fewer transmissions (e.g., retransmissions) by the device and less network traffic. Additionally, in some examples, the device may use a configuration rule received from a base station to determine the transmit powers for the preamble portion and the payload portion, which may reduce signaling overhead related to power configurations.

Aspects of the disclosure are initially described in the context of a wireless communications system. Aspects of the disclosure are further illustrated by and described with reference to process flows and random access messages. Aspects of the disclosure are further illustrated by and described with reference to apparatus diagrams, system diagrams, and flowcharts that relate to open loop power control for two-step random access.

FIG. 1 illustrates an example of a wireless communications system 100 that supports open loop power control for two-step random access in accordance with aspects of the present disclosure. The wireless communications system 100 includes base stations 105, UEs 115, and a core network 130. In some examples, the wireless communications system 100 may be a Long Term Evolution (LTE) network, an LTE-Advanced (LTE-A) network, an LTE-A Pro network, or a New Radio (NR) network. In some cases, wireless communications system 100 may support enhanced broadband communications, ultra-reliable (e.g., mission critical) communications, low latency communications, or communications with low-cost and low-complexity devices.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation NodeB or giga-NodeB (either of which may be referred to as a gNB), a Home NodeB, a Home eNodeB, or some other suitable terminology. Wireless communications system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include uplink transmissions from a UE 115 to a base station 105, or downlink transmissions from a base station 105 to a UE 115. Downlink transmissions may also be called forward link transmissions while uplink transmissions may also be called reverse link transmissions.

The geographic coverage area 110 for a base station 105 may be divided into sectors making up a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. The wireless communications system 100 may include, for example, a heterogeneous LTE/LTE-A/LTE-A Pro or NR network in which different types of base stations 105 provide coverage for various geographic coverage areas 110.

The term "cell" refers to a logical communication entity used for communication with a base station 105 (e.g., over a carrier), and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., machine-type communication (MTC), narrowband Internet-of-Things (NB-IoT), enhanced mobile broadband (eMBB), or others) that may provide access for different types of devices. In some cases, the term "cell" may refer to a portion of a geographic coverage area 110 (e.g., a sector) over which the logical entity operates.

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may also be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like.

Some UEs 115, such as MTC or IoT devices, may be low cost or low complexity devices, and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples half-duplex communications may be performed at a reduced peak rate. Other power conservation techniques for UEs 115 include entering a power saving "deep sleep" mode when not engaging in active communications, or operating over a limited bandwidth (e.g., according to narrowband communications). In some cases, UEs 115 may be designed to support critical functions (e.g., mission critical functions), and a wireless communications system 100 may be configured to provide ultra-reliable communications for these functions.

In some cases, a UE 115 may also be able to communicate directly with other UEs 115 (e.g., using a peer-to-peer (P2P) or device-to-device (D2D) protocol). One or more of a group of UEs 115 utilizing D2D communications may be within the geographic coverage area 110 of a base station 105. Other UEs 115 in such a group may be outside the geographic coverage area 110 of a base station 105, or be otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out between UEs 115 without the involvement of a base station 105.

Base stations 105 may communicate with the core network 130 and with one another. For example, base stations 105 may interface with the core network 130 through backhaul links 132 (e.g., via an S1, N2, N3, or other interface). Base stations 105 may communicate with one another over backhaul links 134 (e.g., via an X2, Xn, or other interface) either directly (e.g., directly between base stations 105) or indirectly (e.g., via core network 130).

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

Wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (e.g., less than 100 km) compared to transmission using the smaller frequencies and longer waves of the high frequency (HF) or very high frequency (VHF) portion of the spectrum below 300 MHz.

Wireless communications system 100 may also operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that may be capable of tolerating interference from other users.

Wireless communications system 100 may also operate in an extremely high frequency (EHF) region of the spectrum (e.g., from 30 GHz to 300 GHz), also known as the millimeter band. In some examples, wireless communications system 100 may support millimeter wave (mmW) communications between UEs 115 and base stations 105, and EHF antennas of the respective devices may be even smaller and more closely spaced than UHF antennas. In some cases, this may facilitate use of antenna arrays within a UE 115. However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

In some cases, wireless communications system 100 may utilize both licensed and unlicensed radio frequency spectrum bands. For example, wireless communications system 100 may employ License Assisted Access (LAA), LTE-Unlicensed (LTE-U) radio access technology, or NR technology in an unlicensed band such as the 5 GHz ISM band. When operating in unlicensed radio frequency spectrum bands, wireless devices such as base stations 105 and UEs 115 may employ listen-before-talk (LBT) procedures to ensure a frequency channel is clear before transmitting data. In some cases, operations in unlicensed bands may be based on a carrier aggregation configuration in conjunction with component carriers operating in a licensed band (e.g., LAA). Operations in unlicensed spectrum may include downlink transmissions, uplink transmissions, peer-to-peer transmissions, or a combination of these. Duplexing in unlicensed spectrum may be based on frequency division duplexing (FDD), time division duplexing (TDD), or a combination of both.

In some examples, base station 105 or UE 115 may be equipped with multiple antennas, which may be used to employ techniques such as transmit diversity, receive diversity, multiple-input multiple-output (MIMO) communications, or beamforming. For example, wireless communications system 100 may use a transmission scheme between a transmitting device (e.g., a base station 105) and a receiving device (e.g., a UE 115), where the transmitting device is equipped with multiple antennas and the receiving device is equipped with one or more antennas. MIMO communications may employ multipath signal propagation to increase the spectral efficiency by transmitting or receiving multiple signals via different spatial layers, which may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream, and may carry bits associated with the same data stream (e.g., the same codeword) or different data streams. Different spatial layers may be associated with different antenna ports used for channel measurement and reporting. MIMO techniques include single-user MIMO (SU-MIMO) where multiple spatial layers are transmitted to the same receiving device, and multiple-user MIMO (MU-MIMO) where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105 or a UE 115) to shape or steer an antenna beam (e.g., a transmit beam or receive beam) along a spatial path between the transmitting device and the receiving device. Beamforming may be achieved by combining the signals communicated via antenna elements of an antenna array such that signals propagating at particular orientations with respect to an antenna array experience constructive interference while others experience destructive interference. The adjustment of signals communicated via the antenna elements may include a transmitting device or a receiving device applying certain amplitude and phase offsets to signals carried via each of the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In one example, a base station 105 may use multiple antennas or antenna arrays to conduct beamforming operations for directional communications with a UE 115. For instance, some signals (e.g. synchronization signals, reference signals, beam selection signals, or other control signals) may be transmitted by a base station 105 multiple times in different directions, which may include a signal being transmitted according to different beamforming weight sets associated with different directions of transmission. Transmissions in different beam directions may be used to identify (e.g., by the base station 105 or a receiving device, such as a UE 115) a beam direction for subsequent transmission and/or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based at least in in part on a signal that was transmitted in different beam directions. For example, a UE 115 may receive one or more of the signals transmitted by the base station 105 in different directions, and the UE 115 may report to the base station 105 an indication of the signal it received with a highest signal quality, or an otherwise acceptable signal quality. Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115), or transmitting a signal in a single direction (e.g., for transmitting data to a receiving device).

A receiving device (e.g., a UE 115, which may be an example of a mmW receiving device) may try multiple receive beams when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets applied to signals received at a plurality of antenna elements of an antenna array, or by processing received signals according to different receive beamforming weight sets applied to signals received at a plurality of antenna elements of an antenna array, any of which may be referred to as "listening" according to different receive beams or receive directions. In some examples a receiving device may use a single receive beam to receive along a single beam direction (e.g., when receiving a data signal). The single receive beam may be aligned in a beam direction determined based at least in part on listening according to different receive beam directions (e.g., a beam direction determined to have a highest signal strength, highest signal-to-noise ratio, or otherwise acceptable signal quality based at least in part on listening according to multiple beam directions).

In some cases, the antennas of a base station 105 or UE 115 may be located within one or more antenna arrays, which may support MIMO operations, or transmit or receive beamforming. For example, one or more base station antennas or antenna arrays may be co-located at an antenna assembly, such as an antenna tower. In some cases, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations.

In some cases, wireless communications system 100 may be a packet-based network that operate according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use hybrid automatic repeat request (HARQ) to provide retransmission at the MAC layer to improve link efficiency. In the control plane, the RRC protocol layer may provide establishment, configuration, and maintenance of an RRC connection between a UE 115 and a base station 105 or core network 130 supporting radio bearers for user plane data. At the Physical layer, transport channels may be mapped to physical channels.

In some cases, UEs 115 and base stations 105 may support retransmissions of data to increase the likelihood that data is received successfully. HARQ feedback is one technique of increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., signal-to-noise conditions). In some cases, a wireless device may support same-slot HARQ feedback, where the device may provide HARQ feedback in a specific slot for data received in a previous symbol in the slot. In other cases, the device may provide HARQ feedback in a subsequent slot, or according to some other time interval.

Time intervals in LTE or NR may be expressed in multiples of a basic time unit, which may, for example, refer to a sampling period of $T_s$=1/30,720,000 seconds. Time intervals of a communications resource may be organized according to radio frames each having a duration of 10 milliseconds (ms), where the frame period may be expressed as $T_f$=307,200 $T_s$. The radio frames may be identified by a system frame number (SFN) ranging from 0 to 1023. Each frame may include 10 subframes numbered from 0 to 9, and each subframe may have a duration of 1 ms. A subframe may be further divided into 2 slots each having a duration of 0.5 ms, and each slot may contain 6 or 7 modulation symbol periods (e.g., depending on the length of the cyclic prefix prepended to each symbol period). Excluding the cyclic prefix, each symbol period may contain 2048 sampling periods. In some cases, a subframe may be the smallest scheduling unit of the wireless communications system 100, and may be referred to as a transmission time interval (TTI). In other cases, a smallest scheduling unit of the wireless communications system 100 may be shorter than a subframe or may be dynamically selected (e.g., in bursts of shortened TTIs (sTTIs) or in selected component carriers using sTTIs).

In some wireless communications systems, a slot may further be divided into multiple mini-slots containing one or more symbols. In some instances, a symbol of a mini-slot or a mini-slot may be the smallest unit of scheduling. Each symbol may vary in duration depending on the subcarrier spacing or frequency band of operation, for example. Further, some wireless communications systems may implement slot aggregation in which multiple slots or mini-slots are aggregated together and used for communication between a UE 115 and a base station 105.

The term "carrier" refers to a set of radio frequency spectrum resources having a defined physical layer structure for supporting communications over a communication link 125. For example, a carrier of a communication link 125 may include a portion of a radio frequency spectrum band that is operated according to physical layer channels for a given radio access technology. Each physical layer channel may carry user data, control information, or other signaling. A carrier may be associated with a pre-defined frequency channel (e.g., an evolved universal mobile telecommunication system terrestrial radio access (E-UTRA) absolute radio frequency channel number (EARFCN)), and may be positioned according to a channel raster for discovery by UEs 115. Carriers may be downlink or uplink (e.g., in an FDD mode), or be configured to carry downlink and uplink communications (e.g., in a TDD mode). In some examples, signal waveforms transmitted over a carrier may be made up of multiple sub-carriers (e.g., using multi-carrier modulation (MCM) techniques such as orthogonal frequency division multiplexing (OFDM) or discrete Fourier transform spread OFDM (DFT-S-OFDM)).

The organizational structure of the carriers may be different for different radio access technologies (e.g., LTE, LTE-A, LTE-A Pro, NR). For example, communications over a carrier may be organized according to TTIs or slots, each of which may include user data as well as control information or signaling to support decoding the user data. A carrier may also include dedicated acquisition signaling (e.g., synchronization signals or system information, etc.) and control signaling that coordinates operation for the carrier. In some examples (e.g., in a carrier aggregation configuration), a carrier may also have acquisition signaling or control signaling that coordinates operations for other carriers.

Physical channels may be multiplexed on a carrier according to various techniques. A physical control channel and a physical data channel may be multiplexed on a downlink carrier, for example, using time division multiplexing (TDM) techniques, frequency division multiplexing (FDM) techniques, or hybrid TDM-FDM techniques. In some examples, control information transmitted in a physical control channel may be distributed between different control regions in a cascaded manner (e.g., between a common control region or common search space and one or more UE-specific control regions or UE-specific search spaces).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of predetermined bandwidths for carriers of a particular radio access technology (e.g., 1.4, 3, 5, 10, 15, 20, 40, or 80 MHz). In some examples, each served UE 115 may be configured for operating over portions or all of the carrier bandwidth. In other examples, some UEs 115 may be configured for operation using a narrowband protocol type that is associated with a predefined portion or range (e.g., set of subcarriers or RBs) within a carrier (e.g., "in-band" deployment of a narrowband protocol type).

In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme). Thus, the more resource elements that a UE 115 receives and the higher the order of the modulation scheme, the higher the data rate may be for the UE 115. In MIMO systems, a wireless communications resource may refer to a combination of a radio frequency spectrum resource, a time resource, and a spatial resource (e.g., spatial layers), and the use of multiple spatial layers may further increase the data rate for communications with a UE 115.

Devices of the wireless communications system 100 (e.g., base stations 105 or UEs 115) may have a hardware configuration that supports communications over a particular carrier bandwidth, or may be configurable to support communications over one of a set of carrier bandwidths. In some examples, the wireless communications system 100 may include base stations 105 and/or UEs 115 that support simultaneous communications via carriers associated with more than one different carrier bandwidth.

Wireless communications system 100 may support communication with a UE 115 on multiple cells or carriers, a feature which may be referred to as carrier aggregation or multi-carrier operation. A UE 115 may be configured with multiple downlink component carriers and one or more uplink component carriers according to a carrier aggregation configuration. Carrier aggregation may be used with both FDD and TDD component carriers.

In some cases, wireless communications system 100 may utilize enhanced component carriers (eCCs). An eCC may be characterized by one or more features including wider carrier or frequency channel bandwidth, shorter symbol duration, shorter TTI duration, or modified control channel configuration. In some cases, an eCC may be associated with a carrier aggregation configuration or a dual connectivity configuration (e.g., when multiple serving cells have a suboptimal or non-ideal backhaul link). An eCC may also be configured for use in unlicensed spectrum or shared spectrum (e.g., where more than one operator is allowed to use the spectrum). An eCC characterized by wide carrier bandwidth may include one or more segments that may be utilized by UEs 115 that are not capable of monitoring the whole carrier bandwidth or are otherwise configured to use a limited carrier bandwidth (e.g., to conserve power).

In some cases, an eCC may utilize a different symbol duration than other component carriers, which may include use of a reduced symbol duration as compared with symbol durations of the other component carriers. A shorter symbol duration may be associated with increased spacing between adjacent subcarriers. A device, such as a UE 115 or base station 105, utilizing eCCs may transmit wideband signals (e.g., according to frequency channel or carrier bandwidths of 20, 40, 60, 80 MHz, etc.) at reduced symbol durations (e.g., 16.67 microseconds). A TTI in eCC may consist of one or multiple symbol periods. In some cases, the TTI duration (that is, the number of symbol periods in a TTI) may be variable.

Wireless communications system 100 may be an NR system that may utilize any combination of licensed, shared, and unlicensed spectrum bands, among others. The flexibility of eCC symbol duration and subcarrier spacing may allow for the use of eCC across multiple spectrums. In some examples, NR shared spectrum may increase spectrum utilization and spectral efficiency, specifically through dynamic vertical (e.g., across the frequency domain) and horizontal (e.g., across the time domain) sharing of resources.

Generally, UE 115 may receive system information from a base station 105, the system information indicating at least one configuration rule for power control parameter setting for random access. The UE 115 may measure one or more reference signals (e.g., as indicated the system information). The UE 115 may estimate a path loss of wireless communications between the base station 105 and the UE 115 based at least in part on the measured reference signals. UE 115 may select one or more parameters from one or more sets of parameters indicated in the configuration rule. The UE 115 may select a first transmit power for a preamble portion of a random access message and a second transmit power for a payload portion of the random access message, based at least in part on the estimated path loss. UE 115 may transmit the random access message according to the selected first and second transmit powers.

Open loop power control for a two-step random access procedure may decrease excess power expenditure and provide increased granular power control for different UEs 115. That is, a UE 115 may select its own power control, allowing for efficient power expenditure in a variety of circumstances. Further, open loop power control for random access procedures may mitigate multi-user interference (MUI) and address near-far effects of UEs 115 located throughout a geographic coverage area 110.

Figure 2:
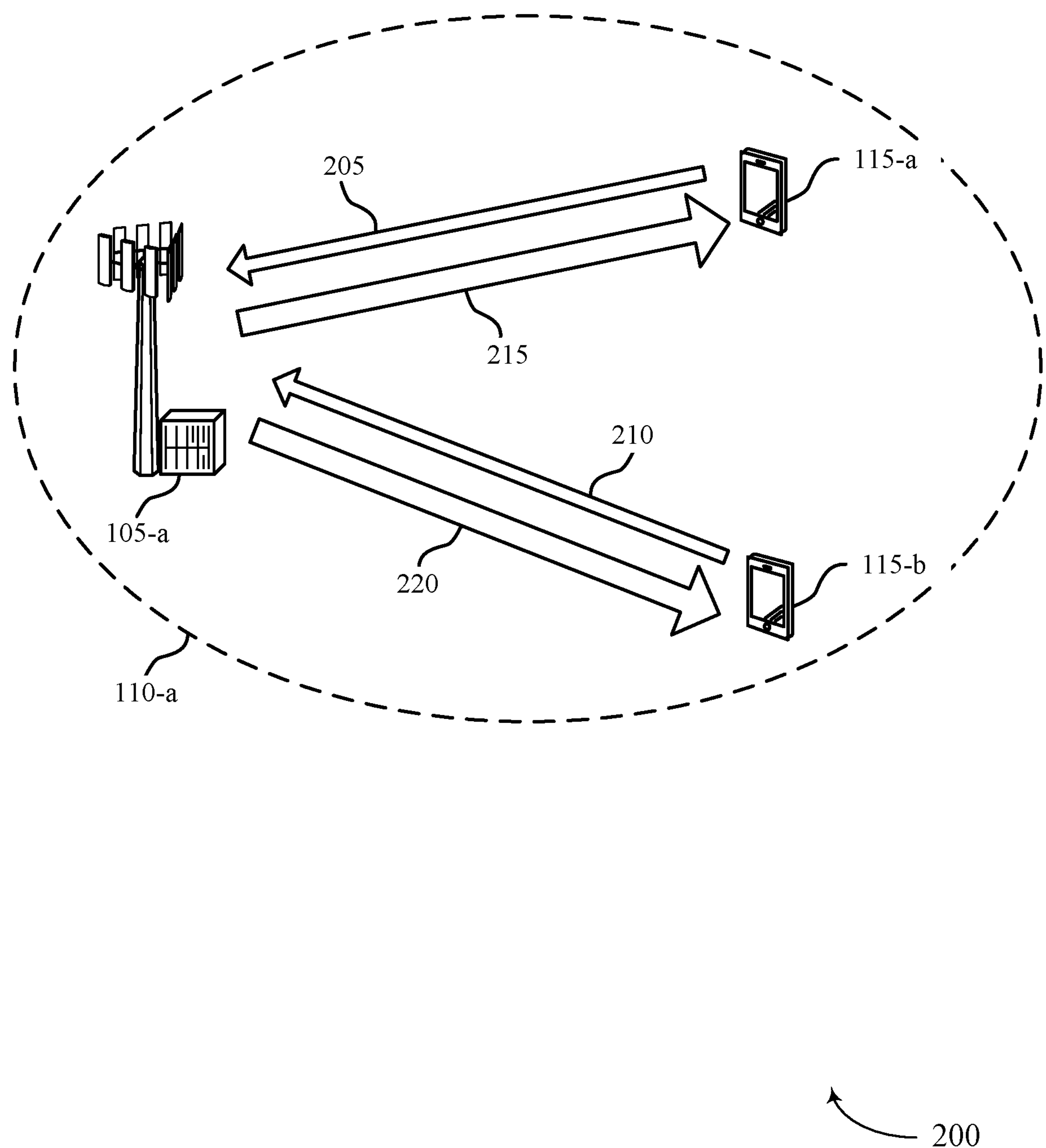
FIG. 2 illustrates an example of a wireless communications system that supports open loop power control for two-step random access in accordance with aspects of the present disclosure.

FIG. 2 illustrates an example of a wireless communications system 200 that supports open loop power control for two-step random access in accordance with aspects of the present disclosure. In some examples, wireless communications system 200 may implement aspects of wireless communications system 100. Wireless communications system 200 may include a base station 105-*a* and a UE 115-*a*, which may be examples of corresponding devices illustrated and described with respect to FIG. 1.

As illustrated, wireless communications system 200 may include multiple UEs (e.g., UE 115-*a* and UE 115-*b*) and base station 105-*a*, which may be examples of a UE 115 or a base station 105, respectively, as described above with reference to FIG. 1.

In some examples (e.g., a four-step random access procedure), UE 115-*a* may calculate power control based on one or more parameters. For example, UE 115-*a* may calculate power control based on equation 1:

$$P_{RACHb,f,c}(i)=\min\{P_{CMAX,f,c}(i),P_{PRACH,target,f,c}+PL_{b,f,c}\}\ [\text{dBm}]$$

where b=uplink bandwidth part, f=carrier frequency, and c=serving cell. $P_{CMAX,f,c}$ may represent a configured maximum UE output power for carrier f of serving cell in each TTI. $P_{RACHb,f,c}(i)$ may represent a physical random access channel (PRACH) target reception power (e.g., which may be indicated in a preambleReceivedTargetPower message (in RRC signaling). The preambleReceivedTargetPower message may indicate a delta preamble, a preamble power ramping counter and counter indication, and preamble power ramping step. The preambleReceivedTargetPower message may be determined following a standardized equation (e.g., as indicated in a standard document such as 3GPP 38.321-5.1.3). The preambleRecievedTargetPower in RRC signaling may indicate a delta preamble and a preamble power ramping counter times a preamble power ramping step (e.g., (PREAMPLE_POWER_RAMPINT_COUNTER−1)×PREAMBLE_POWER_RAMPING_STEP). $PL_{b,f,c}$ may represent a path loss for an active uplink bandwidth part of carrier f based on the downlink reference signal associated with the PRACH transmission on the active downlink bandwidth part of serving cell c. This may be indicated in a referenceSignalPower message (e.g., higher layer filtered RSRP). The referenceSignalPower indication may be determined by an ss-PBCH-BlockPower value.

In some examples (e.g., a four-step random access procedure), a transmit power for an uplink shared channel may be defined by equation 2:

$$P_{PUSCH\ b,f,c}(i,j,q_d,l)=\min\{P_{CMAX}f,c(i),P_{0_{PUSCH,b,f,c}}(j)+10\log_{10}(2^{\mu}*M_{RB,b,f,c}{}^{PUSCH}(i))+\alpha_{b,f,c}*(PL_{b,f,c}(q_d)+\Delta_{TF,b,f,c}(i)+f_{b,f,c}(i,l)\}$$

where i=a transmission occasion, j=a parameter set configuration index, $q_d$=a reference signal index for the active downlink bandwidth part, and l represents a physical uplink shared channel (PUSCH) power control adjustment state index.

$P_{0_{PUSCH},b,f,c(j)}$ may represent $$P_{0_{PUSCHNOMINALPUSCH,f,c}}(j)+P_{0_{PUE_{PUSCH_{b,f,c}}}}(j),$$

determine by one or more of a preambleReceivedTarget Power message, a msg3-DeltaPreamble, a ConfiguredGrant-Config message, a p0-NominalWithoutGrant message, a P0-PUSCH-Alpha message, a p0-PUSCH-AlphaSet message, a sounding reference signal (SRS) resource indicator (SRI)-PUSCHPowerControl message, and an SRI field in downlink control information (DCI) format 0_0/0_1 message. $M_{RB,b,f,c}{}^{PUSCH}(i)$ may represent a bandwidth of the PUSCH resource assignment expressed in number of resource blocks. $\alpha_{b,f,c}$ may be determined by a msg3-Alpha, a ConfiguredGrantConfig message, a p0-PUSCH-Alpha message, a P0-PUSCH-AlphaSet, an SRI-PUSCHPower-Control message, and/or an SRI field in DCI format 0_0/0_1. In some examples, message 3 of a four-step random access procedure may be dependent upon message 1 of the four-step random access procedure. $PL_{b,f,c}(q_d)$ may represent path loss. $\Delta_{TF,b,f,c}(i)$ may represent a change in MCS, where for $K_s$=1.25, $10\log_{10}(2^{BPR*K},-1)*\beta_{offset}{}^{PUSCH})$, and for $K_s$=0, 0. $f_{b,f,c}(i, l)$ may represent PUSCH power control adjustment state=$f_{b,f,c}(i-i_0, l)+\Sigma_{m=0}{}^{C(D,)-1}\ \partial_{PUSCH,b,f,c}(m, l)$ where $\partial_{PUSCH,b,f,c}$ is determined by transmit power control (TPC).

In some examples, UE 115-*a* may use a two-step random access channel (RACH) instead of a four-step random access procedure. UE 115-*a* may send an uplink request message to base station 105-*a* via uplink 205. The uplink request message may be a first message (e.g., message A) in the two-step random access procedure. In some cases, base station 105-*a* may identify that the uplink request message is message A of the two-step random access procedure. In response to message A, base station 105-*a* may transmit, on downlink 215, message B of a two-step RACH procedure, as described in greater detail with respect to FIG. 3. Similarly, UE 115-*b* may transmit a message A of a two-step random access procedure on uplink 210 and may receive message B of the two-step random access procedure via downlink 220. The two-step random access procedure may result in improved spectral efficiency and energy efficiency. Instead of performing the increased signaling of a four-step random access procedure, a UE 115 and base station 105 that utilize a two-step random access procedure may expend less power and utilize less resources (e.g., due to less signaling). However, due to the open loop nature of the two-step random access procedure, base station 105-*a* and UEs 115 may perform power control procedures to account for intra-cell interference, different payload sizes, different MCS, and power ramping for retransmissions.

Figure 4:
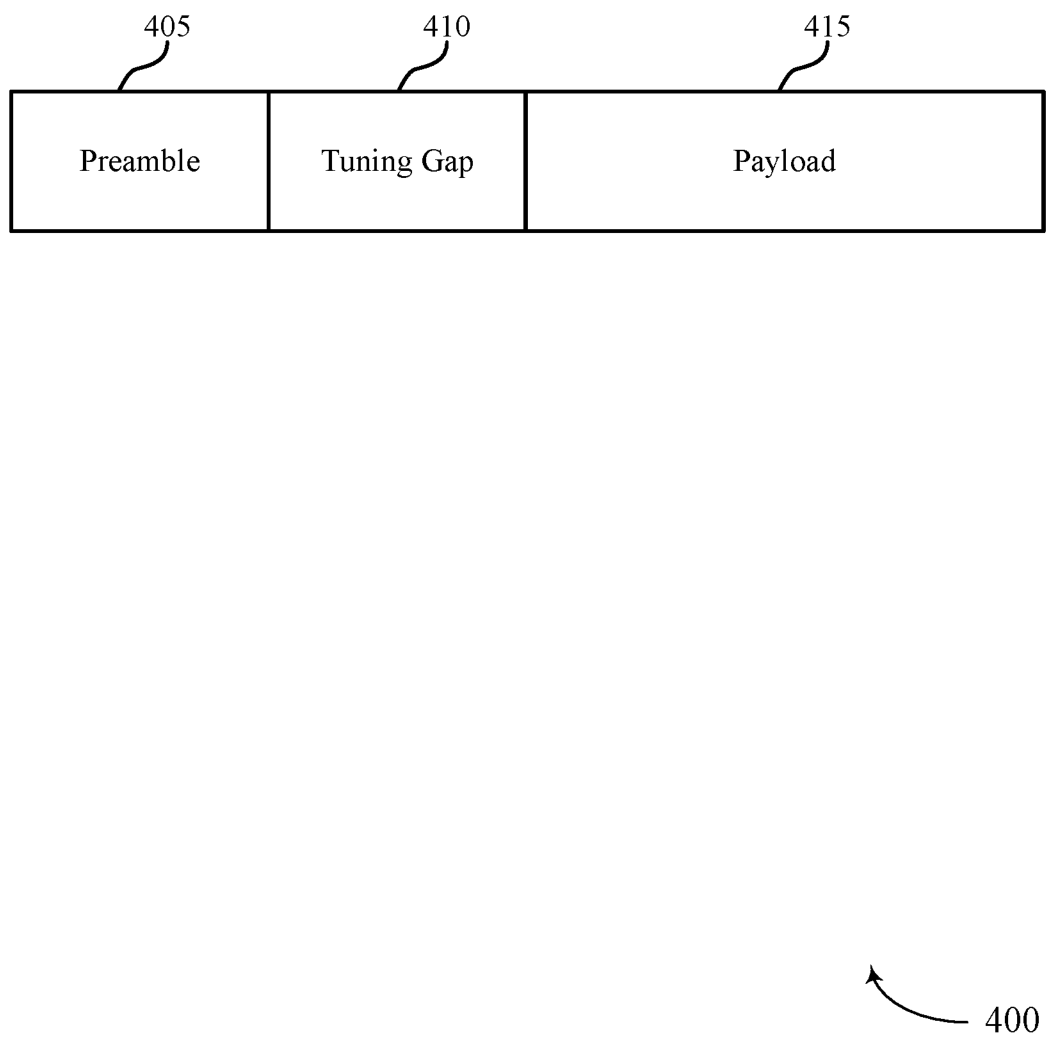
FIG. 4 illustrates an example of a random access message that supports open loop power control for two-step random access in accordance with aspects of the present disclosure.

In some cases, message A of the two-step random access procedure may include a preamble portion and a payload portion, as described in greater detail with respect to FIG. 4. UE 115-*a* may transmit message A on uplink 205 without first receiving an uplink grant from base station 105-*a*. The resources allocated for transmitting message A may be shared by multiple UEs (UE 115-*a* and UE 115-*b*) in a non-orthogonal manner. In such examples, message A transmitted by UE 115-*a* may interfere with a message A transmitted by UE 115-*b*. UE 115-*a* and UE 115-*b* may perform power control procedures for sending message A as described herein to mitigate such intra-cell interference.

In some examples, different payload sizes or different MCS may be supported by different RRC states. That is, the payload portion of a message A may have different sizes for different RRC states (e.g., idle, active, connected, etc.), which may affect a power control procedures for sending message A. For instance, UE 115-*a* may be in an idle or disconnected state, while UE 115-*b* may be in an active state. UE 115-*a* may thus send a message A with a payload that is different than the payload for message A send by UE 115-*b*. In such examples, UE 115-*a* may select a transmit power for the payload portion of message A that is different than the transmit power selected by UE 115-*b* for sending the payload portion of a message A.

In some cases, when base station 105-*a* does not successfully receive message A (e.g., when UE 115-*a* does not receive message B from base station 105-*a* within a threshold amount of time), UE 115-*a* may select a power ramping procedure to resend message A. However, open loop power ramping procedures conventionally used for sending message 1 and the closed loop power ramping procedures used for sending message 3 of a conventional four-step random access procedure may not be suitable for sending message A of a two-step random access procedure. Instead, UE 115-*a* may apply a first power ramping procedure to the preamble portion of message A and a second power ramping procedure to the payload portion of message A.

UE 115-*a* may select transmit power for sending the preamble and payload portions of message A according to one or more configuration rules for power control parameter setting. UE 115-*a* may obtain system information from a base station (e.g., an SIB, an MIB, an RMSI, or the like). The system information may indicate (e.g., provide a parameter range, target, or the like) one or more configuration rules for power control parameter setting. That is, the one or more configuration rules may include or indicate one or more sets of parameters (e.g., a set of target received power values, a set of path loss compensation factor values, or the like), and UE 115-*a* may select a value for each parameter of the sets of received parameters and calculate transmit powers for the preamble and payload based thereon. UE 115-*a* may calculate the first and second transmit powers based on one or more of cell size, RRC states, a bandwidth, and a numerology for the preamble and the payload of message A, respectively, and transmit beams for sending the preamble and the payload of message A. If an initial transmission of message A fails, then UE 115-*a* may apply different power ramping procedures to the preamble of message A and the payload portion of message A.

In some examples, UE 115-*a* may measure one or more reference signals and may estimate path loss between base station 105-*a* and the UE 115-*a*. UEs 115 may select resources on which to transmit part or all of message A based on the estimated path loss. For instance, UE 115-*a* and UE 115-*b* may have different path losses. UE 115-*a* may be a strong UE (e.g., have a low path loss) and UE 115-*b* may be a weak UE (e.g., have a high path loss). In such examples, UE 115-*a* and UE 115-*b* may select preamble sequences with different roots, and may send their respective preambles using the same resources preconfigured for preamble transmissions. UE 115-*a* and UE 115-*b* may select different sets of resources over which to transmit the respective payload portions of message A. In some examples, base station 105-*a* may determine that UE 115-*a* is a strong UE based on the resources over which the payload portion of message A is received, and may determine that UE 115-*b* is a weak UE based on the resources over which the payload portion of message a is received. Base station 105-*a* may thus separate the signals received over the strong UE resources from those received over the weak UE resources. This may increase the likelihood that base station 105-*a* will be able to successfully receive the payload of message A from weak UEs 115 as well as strong UEs 115 (instead of receiving all payloads on the same resources such that interference from the strong UEs 115 overcomes the signals from the weak UEs). In some examples, UE 115-*a* and UE 115-*b* may have the same or similar path loss. In such examples, UE 115-*a* and UE 115-*b* may select preamble sequences with the same root, and may send the payload portion of message A on the same set of resources.

In some examples, UE 115-*a* and UE 115-*b* may determine, based on an indication in the system information, over which set of resources to transmit the payload portion of message A (e.g., determine what group they are in). For example, the base station 105-*a* may send an indication, in the system information, of a set of ranges or thresholds indicating different UE 115 groups. That is, if UE 115-*a* estimates a path loss within a first range (e.g., $[a_k, a_{k+1}]$) then UE 115-*a* may determine that it has a low path loss and is to send the payload portion of message A over a first set of resources (e.g., UE 115-*a* is in a first group). In some examples, if UE 115-*a* determines that it has a low path loss, it may select a preamble sequence from a subset of preamble sequences $S_k$ associated with one or multiple root sequences with a cyclic shift step size $L_k$. If UE 115-*b* estimates a path loss within a second range, then UE 115-*b* may determine that it has a high path loss and is to send the payload portion of message A over a second set of resources (e.g., UE 115-*b* is in a second group). In some examples, if UE 115-*b* determines that it has a high pay loss, it may select a preamble sequence from a different subset of preamble sequences associated with one or multiple root sequences with a different cyclic shift step size. In some examples, base station 105-*a* may be able to detect a preamble of message A from weak UEs (e.g., UEs with high path loss) based on the different preambles having different roots.

In some implementations, UE 115-*a* may estimate the path loss based on more than one type of reference signal. UE 115-*a* may receive an indication from base station 105-*a* of which types of reference signals to measure. For example, base station 105-*a* may indicate, in system information, that UE 115-*a* is to monitor one or more of synchronization signal blocks (SSBs), SIBs downlink positioning reference signals (PRSs) channel state information reference signals (CSI-RSs) or the like. UE 115-*a* may perform measurements on each type of reference signal indicated in the system information. Then, UE 115-*a* may estimate a path loss between base station 105-*a* and UE 115-*a* based thereon. For instance, UE 115-*a* may average the measurements and estimate an average path loss. Alternatively, UE 115-*a* may receive a set of weighted values for each type of indicated reference signal, may apply the weighted values to the measurements for each type of indicated reference signal, and may estimate a path loss based on the weighted measurements.

Figure 3:
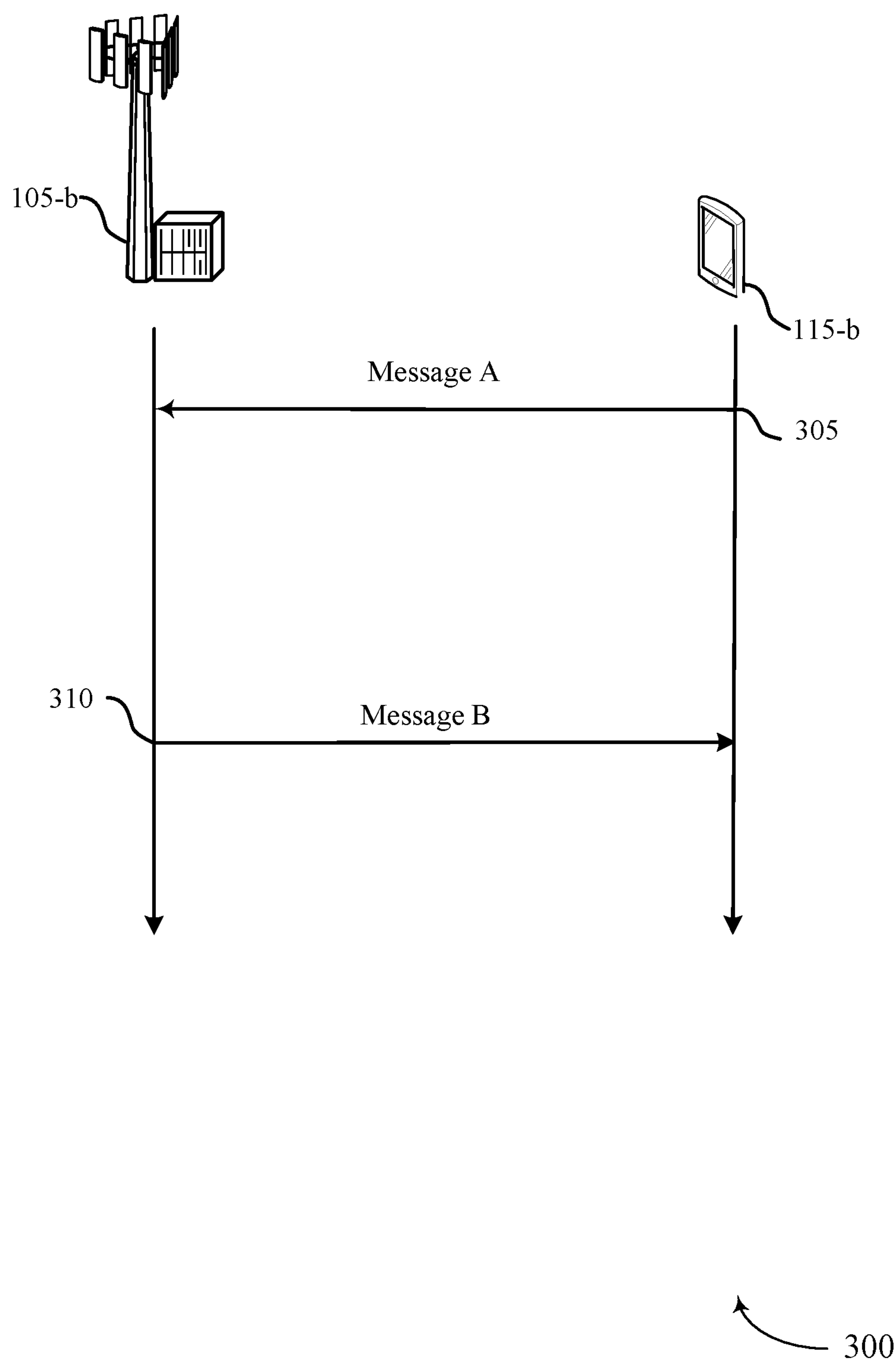
FIG. 3 illustrates an example of a process flow that supports open loop power control for two-step random access in accordance with aspects of the present disclosure.

FIG. 3 illustrates an example of a process flow 300 that supports open loop power control for two-step random access in accordance with aspects of the present disclosure. In some examples, process flow 300 may implement aspects of wireless communications systems 100 and 200. Process flow 300 may include a base station 105-*b* and a UE 115-*b*, which may be corresponding examples of devices illustrated and described with respect to FIGS. 1 and 2. In some examples, base station 105-*a* and UE 115-*b* may perform a two-step random access procedure.

At 305, UE 115-*b* may send to base station 105-*b* a first message of a two-step random access procedure (e.g., message A). UE 115-*b* may send message A without receiving a grant from base station 105-*b*. Message A may include at least three physical channels or signals, as described in greater detail with respect to FIG. 4. For example, message A may include a preamble, and a payload portion of message A may include a demodulation reference signal (DMRS), and a PUSCH. In some examples, the resources over which UE 115-*b* transmits message A may be shared by multiple UEs 115 in a non-orthogonal way. The payload portion of message A may be different depending on an RRC state for UE 115-*b*.

Figure 5:
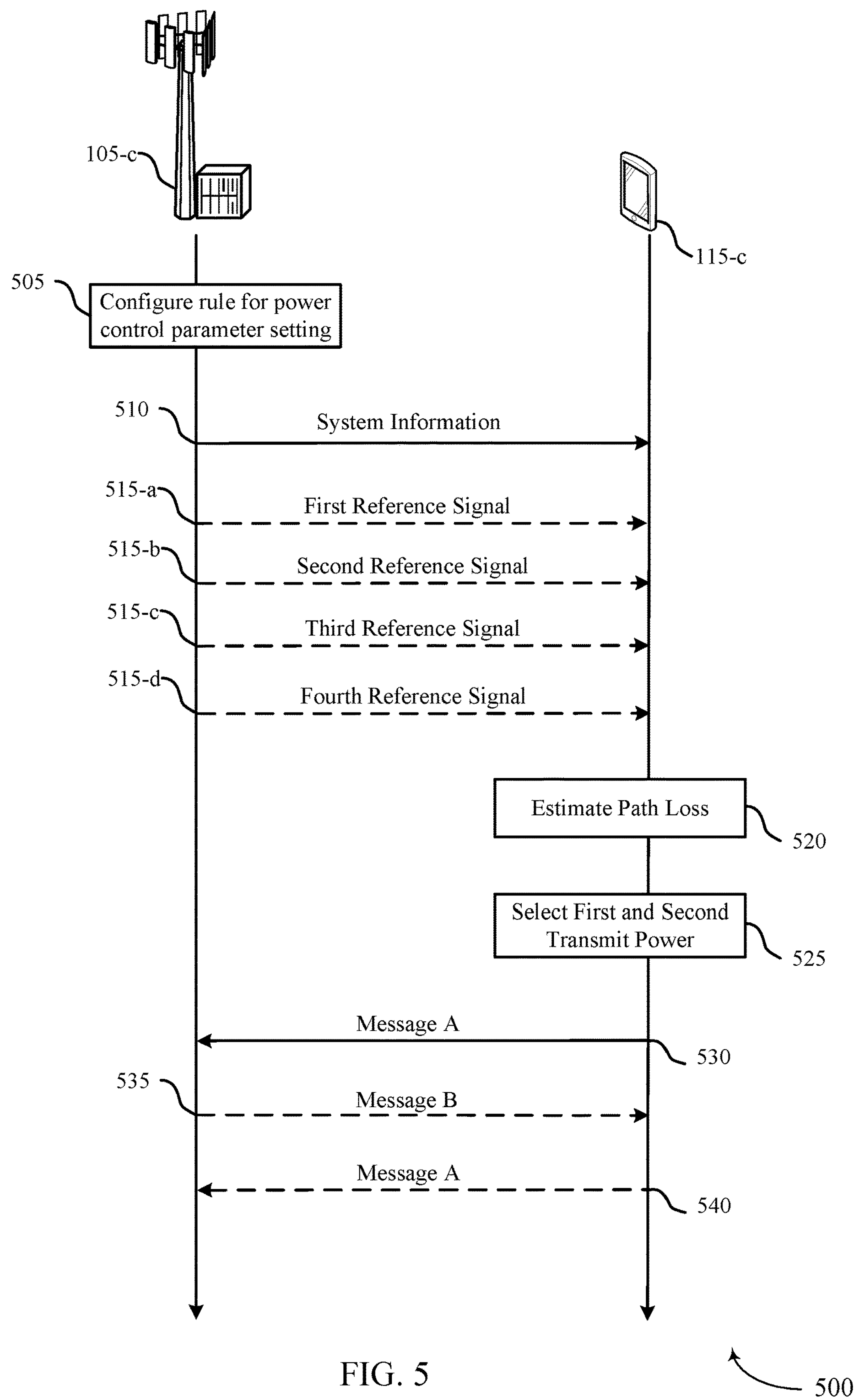
FIG. 5 illustrates an example of a process flow that supports open loop power control for two-step random access in accordance with aspects of the present disclosure.

As described in greater detail with respect to FIG. 5, UE 115-*b* may select transmit powers for sending different portions of message A. That is, UE 115-*b* may select a transmit power for a preamble portion of message A and a payload portion of message A.

At 310, base station 105-*b* may send a second message of a two-step random access procedure (e.g., message B). Message B may carry, for example, control information, downlink or uplink grants, and the like.

In some examples, as described in greater detail with respect to FIG. 5, base station 105-*b* may not receive or decode message A successfully. In such examples, UE 115-*b* may wait for a predetermined or threshold amount of time to receive message B. If UE 115-*b* does not receive message A during the predetermined or threshold amount of time, then UE 115-*b* may send a retransmission of message A. In such examples, UE 115-*b* may perform power ramping procedures. UE 115-*b* may ramp up transmit power for one or more retransmissions of message A However, UE 115-*b* may apply different power ramping procedures for the preamble portion of message A, and the payload portion of message A.

FIG. 4 illustrates an example of a random access message 400 that supports open loop power control for two-step random access in accordance with aspects of the present disclosure. In some examples, random access message 400 may implement aspects of wireless communications system 100. A UE 115 may send random access message 400 to a base station 105 as a first message (e.g., message A) in a two-step random access procedure.

Message A may include a preamble 405. Preamble 405 may include a preamble sequence selected from a set or subset of preamble sequences. A UE 115 may select the preamble sequence for preamble 405 based on an estimated path loss. In some examples, UE 115 may estimate a path loss, and compare the path loss to a threshold path loss value received from the base station 105. If the estimated path loss value satisfies the path loss threshold, then UE 115 may randomly select a preamble sequence from a first subset of preamble sequences. If the estimated path loss value does not satisfy the path loss threshold, then UE 115 may randomly select a preamble sequence from a second subset of preamble sequences. In some examples, UE 115 may receive an indication of a set of ranges of path loss values from the base station 105 (e.g., in system information). UE 115 may determine into which range an estimated path loss value falls, and may select a preamble sequence from a corresponding subset of preamble sequences based on the determined range.

In some examples, a tuning gap 410 may be included in message A. Tuning gap 410 may be located after preamble 405 and before payload 415. UE 115 may perform tuning or other adjustments during tuning gap 410. For example, preamble 405 and payload 415 may be sent using different numerologies. In some examples, UE 115 may send preamble 405 and payload 415 on different bandwidths (e.g., different resources). In some examples, UE 115 may apply a different power control scheme to preamble 405 and payload 415. In some examples, preamble 405 and payload 415 may correspond to different sampling rates. In one of these examples or in any combination of these examples, UE 115 may perform tuning after sending preamble 405 and before sending payload 415.

Message A may include a payload 415. Payload 415 may include a DMRS and a PUSCH. Payload 415 may have a varying size, depending on an RRC state (e.g., idle, active, connected, etc.).

UE 115 may select a transmit power for preamble 405 and a transmit power for payload 415. The respective transmit powers for preamble 405 and payload 415 may be different, as described in greater detail with respect to FIG. 5.

FIG. 5 illustrates an example of a process flow 500 that supports open loop power control for two-step random access in accordance with aspects of the present disclosure. In some examples, process flow 500 may implement aspects of wireless communications system 100. Process flow 500 may include a base station 105-*c* and a UE 115-*c* which may be examples of corresponding devices illustrated and described with respect to FIGS. 1, 2, and 3.

At 505, base station 105-*c* may configure at least one configuration rule for power control parameter setting for random access signaling from UE 115-*c*. The configuration rule for power control parameter setting may include or indicate (e.g., via indexing or the like) one or more sets of parameters. For instance, the configuration rule for power control parameter setting may indicate a set of path loss compensation factor values.

At 510, base station 105-*c* may transmit system information. The system information may include an indication of the at least one configuration rule for power control parameter setting for random access (e.g., $P_0$ (target received power), a (path loss compensation factor) etc.). Base station 105-*c* and UE 115-*c* may support both full and fractional path loss compensation for payload and preamble transmission (e.g., the path loss compensation factor values indicated by the configuration rule may range from zero to one, including fractional values). UE 115-*c* may be capable of selecting, based on an estimated path loss, a parameter value from indicated sets of parameter values. UE 115-*c* may also support transmission of the preamble and payload at different transmit powers and over different sets or subsets of resources.

At 515, base station 105 may transmit one or more reference signals. For example, at 515-*a*, base station 105-*c* may transmit a first reference signal (e.g., an SSB). At 515-*b*, base station 105-*c* may transmit a second reference signal (e.g., an SIB which may be the same or different system information as that transmitted at 510). At 515-*c*, base station 105-*c* may transmit a third reference signal (e.g., a PRS). At 515-*d*, base station 105-*c* may transmit a fourth reference signal (e.g., a CSI-RS). In some examples, one or more of the reference signals transmitted at 515 may be on the same carrier, and one or more of the reference signals transmitted at 515 may be on different carriers.

At 520, UE 115-*c* may estimate a path loss of wireless communications between base station 105-*c* and UE 115-*c* based at least in part on the reference signals transmitted at 515. UE 115-*c* may take measurements on one or more of the reference signals sent at 515. In some examples, UE 115-*c* may receive, in system information at 510, an indication of a set of reference signal types on which to perform measurements. For example, the system information may indicate that UE 115-*c* is to perform measurements on one, some, or all of an SIB, a PRS, an SSB, and a CSI-RS. Accordingly, UE 115-*c* may perform the measurements on one or more of the reference signal types, based on the indication.

UE 115-*c* may estimate a path loss based on the measurements. In some examples, UE 115-*c* may determine an average value of the performed measurements. In some examples, UE 115-*c* may receive, in the system information, an indication of weights for weighted combining of the measurements. For example, UE 115-*c* may receive a set of weights (e.g., $w(i) \in [0,1]$), each weight of the set corresponding to one of the indicated reference signal types. After measuring each of the indicated types of reference signals, UE 115-*c* may apply the weights to the measurements for a more accurate estimated path loss. For example, UE 115-*c* may estimate a path loss using equation 3:

$$\text{total path loss}=w(1)*\text{Path Loss}_{SSB}+w(2)*\text{Path Loss}_{SIB}+w(3)*\text{Path Loss}_{PRS}+w(4)*\text{Path Loss}_{CSI\text{-}RS}.$$

In some examples, UE 115-*c* may estimate path loss using reference signal measurements from multiple carriers. For instance, UE 115-*c* may receive system information or reference signals on a first component carrier, and may have previously measured one or more of first, second, third, and fourth reference signals on a second carrier. In such examples, UE 115-*c* may determine that the first component carrier and the second component carrier are sufficiently similar (e.g., share path loss, or other channel state conditions), and may utilize measurements from the second component carrier to determine path loss on the first component carrier. In some examples, base station 105-*c* may indicate a transmit power and beam forming gain for one or more of the configured reference signals to improve the accuracy of path loss estimation at UE 115-*c*. Such information may be included in the system information.

At 525, UE 115-*c* may select a first transmit power for a first portion (e.g., a preamble) of a random access message (e.g., message A), and may select a second transmit power for a second portion (e.g., a payload) of the random access message (e.g., message A). Transmit power for each of the preamble and the payload portions of message A may be based on one or more selected parameters. For example, UE 115-*c* may calculate a transmit power for the preamble of message A, and a transmit power for the payload portion of message A based at least in part on a path loss compensation factor value and a target receive power value.

In some examples, UE 115-*c* may select the first transmit power and the second transmit power based at least in part on a path loss compensation factor value. As described above, UE 115-*c* may receive, in the system information at 510, a configuration rule for power control parameter settings that indicates a set of path loss compensation factor values (e.g., a set of $\alpha$ values). The set of $\alpha$ values may support both full path loss compensation for the payload and the preamble, and fractional path loss compensation for payload preamble transmission. That is, the set of $\alpha$ values may range from 0 to 1, including fractional values (e.g., 0.5, 0.8, and 1). UE 115-*c* may estimate its path loss, and may autonomously select one of the $\alpha$ values from the set of $\alpha$ values indicated in the configuration rule. In some examples, UE 115-*c* may select a first $\alpha$ value for the preamble portion of message A, and a second $\alpha$ value for the payload portion of message A. Both may be based at least in part on the estimated path loss.

In some examples, UE 115-*c* may select the first transmit power and the second transmit power based at least in part on a target received power value. As described above, UE 115-*c* may receive, in the system information at 510, a configuration rule for power control parameter settings that indicates a set of target received power values (e.g., a set of $P_0$ values). UE 115-*c* may, based on the estimated path loss, select a $P_0$ value for the preamble from the set of $P_0$ values, and a $P_0$ value for the payload from the set of $P_0$ values. The set of $P_0$ values may be included in a new message from base station 105-*c*, or existing RRC parameters may be augmented to indicate the set of $P_0$ values.

In some examples, UE 115-*c* may select a $P_0$ value, an $\alpha$ value, or other values upon which a transmit power is calculated based on other parameters. UE 115-*c* may identify a bandwidth and numerology for the preamble and a bandwidth and numerology for the payload, and may select the first and second transmit powers based thereon. In some examples, UE 115-*c* may identify a beam for transmitting the preamble and a beam for transmitting the payload, and may select the first and second transmit powers based on the beamforming scheme of the first beam and a beamforming scheme of the second beam. For instance, all preamble may be transmitted using the same beam (resulting in a first transmit power to address intra-cell interference) and some or all payload portions may be transmitted on a different beam (resulting in another transmit power that is different from the first transmit power). In some examples, UE 115-*c* may select the first transmit power and the second transmit power based on a size of the payload. For instance, for each RRC state (e.g., idle, active, connected, etc.), the payload of message A may have a different size. UE 115-*c* may select the transmit power for the payload based on the current RRC state.

In some examples, UE 115-*c* may select a preamble sequence and/or a set of resources on which to transmit the preamble and the payload, based at least in part on UE 115 grouping. UEs 115 having the same or similar path loss may send message A according to a first configuration, and UEs 115 have different path loss may send message A according to a second configuration.

UE 115-*c* may receive grouping information in system information at 510. The grouping information may include one or more ranges corresponding to path loss estimation values. UE 115-*c* may estimate path loss at 520 and determine in which of the indicated ranges the path loss is located. UE 115-*c* may then select a preamble sequence and resources on which to transmit the payload and preamble of message A based on the selected range. In some examples, UE 115-*c* may receive, from base station 105-*c* in system information at 510, a path loss threshold value. UE 115-*c* may compare the estimated path loss to the threshold. If the estimated path loss satisfies the threshold, then UE 115-*c* may select a preamble and a first subset of resources from a set of configured resources. If the path loss threshold does not satisfy the threshold, then UE 115-*c* may select a preamble and a second subset of resources from a set of configured resources. This may divide UEs 115 served by base station 105-*c* into two groups (e.g., strong UEs 115-*c* and weak UEs 115-*c*).

UEs 115 with different path losses (e.g., a strong UE 115 and a weak UE 115) may send the preamble of message A on the same set of resources configured for sending the preamble, but may select different resources for sending the payload. Interference from strong UEs 115 may be mitigated by base station 105 may receiving the payload portion of message A from weak UEs 115 on different resources than the payload portion of message A from strong UEs.

In some examples, UE 115-*c* may jointly consider preamble selection with power multiplexing. UE 115-*c* may have a different path loss from another UE 115. In such examples, UE 115-*c* and the other UE 115 may select preamble sequences with different roots (e.g., to leverage successive interference cancellation (SIC)). Alternatively, UE 115-*c* may have the same path loss as another UE 115. In such examples, both UE 115-*c* and the other UE 115 may select a preamble sequence with the same root (e.g., when SIC becomes less effective, UE 115-*c* may reduce multi-user interference (MUI) by selecting orthogonal preamble sequences).

At 530, UE 115-*c* may transmit message A according to the first and second transmit powers selected at 525. The first and second transmit powers may be selected, as described above with respect to a variety of parameters and considerations. Each of the parameters and considerations may be considered individually, solely, or in any combination.

At 535, base station 105-*c* may transmit message B of the two-step random access procedure based on message A received from UE 115-*c* at 530. If base station 535 fails to receive message A, then base station 105-*c* may refrain from sending message B at 535.

At 540, UE 115-*c* may wait a predetermined amount of time to receive message B, and may retransmit message A if it does not receive message B within the predetermined amount of time. UE 115-*c* may apply a different power ramping procedure to each of the preamble and the payload. That is, UE 115-*c* may consider different power ramping steps for the preamble and the payload of message A. Base station 105-*c* may indicate power ramping information in a new message, or existing RRC parameters may be augmented to indicate the power ramping to UE 115-*c*.

One or more existing signals (e.g., RRC parameters associated with RACH/PUSCH/RS) may be augmented to include the indications described above. For example, a powerControlOffsetSS message indicating one or more enumerated values (e.g., db-3, db0, db3, db6, etc.) may be augmented to send power control information as described herein (e.g., power ramping steps, target power values, etc.). The powerControlOffsetSS message may be included in an NZP-CSI-RS-Resource message. A msg3-DeltaPreambel message included in a PUSCH-ConfigCommon message may indicate a set of integers (e.g., −1 . . . 6), and may be augmented to indicate, for example, information regarding the preamble of a message A, as described herein. A powerRampingStep message included in a RACH-ConfigGeneric message may indicate a set of enumerated power ramping steps (e.g., db0, db2, db4, db6). This information may be sent to UE 115-*c* to provide, for example, selectable power ramping steps to apply to a preamble or payload portion of a retransmitted message A. A preambleTransMax message included in a RACH-ConfigGeneric message may indicate a set of values (e.g., n3, n4, n5 . . . 20, n50, n100, n2-00). This message may be used to indicate any of the messaging described herein, such as information regarding a preamble maximum transmission power, set of sequences, resources for preamble transmission, etc. A preambleRecievedTargetPower message included in a RACH-ConfigGeneric message may indicate a set of integer values (e.g., −200 . . . −74). This message may indicate information to a UE as described herein, such as a target receive power value or a set of target received power values for a preamble or a payload of message A.

Figure 6:
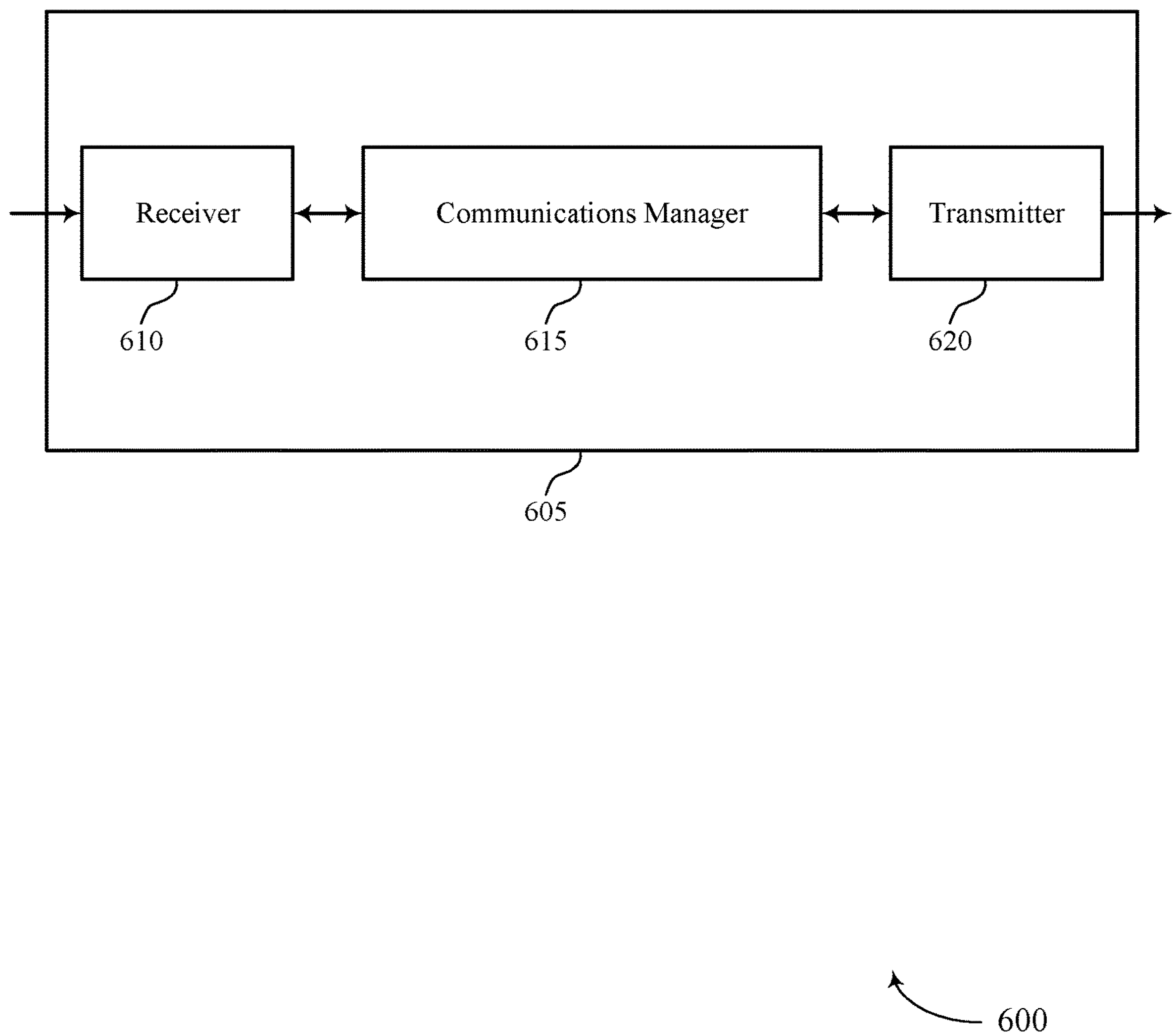
FIGS. 6 and 7 show block diagrams of devices that support open loop power control for two-step random access in accordance with aspects of the present disclosure.

FIG. 6 shows a block diagram 600 of a device 605 that supports open loop power control for two-step random access in accordance with aspects of the present disclosure. The device 605 may be an example of aspects of a UE 115 as described herein. The device 605 may include a receiver 610, a communications manager 615, and a transmitter 620. The device 605 may also include a processor. Each of these components may be in communication with one another (e.g., via one or more buses).

The receiver 610 may receive information such as packets, user data, or control information associated with various information channels (e.g., control channels, data channels, and information related to open loop power control for two-step random access, etc.). Information may be passed on to other components of the device 605. The receiver 610 may be an example of aspects of the transceiver 920 described with reference to FIG. 9. The receiver 610 may utilize a single antenna or a set of antennas.

The communications manager 615 may obtain system information received from a base station, the system information including an indication of at least one configuration rule for power control parameter setting for random access, estimate a path loss of wireless communications between the base station and the UE based on one or more reference signals, select, based on the estimated path loss and the at least one configuration rule for power control parameter setting, a first transmit power for a first portion of a random access message and a second transmit power for a second portion of the random access message, and output the first portion of the random access message and the second portion of the random access message for transmission according to the first transmit power and the second transmit power. The communications manager 615 may be an example of aspects of the communications manager 910 described herein.

The communications manager 615, or its sub-components, may be implemented in hardware, code (e.g., software or firmware) executed by a processor, or any combination thereof. If implemented in code executed by a processor, the functions of the communications manager 615, or its sub-components may be executed by a general-purpose processor, a digital signal processor (DSP), an application-specific integrated circuit (ASIC), a field-programmable gate array (FPGA) or other programmable logic device, discrete gate or transistor logic, discrete hardware components, or any combination thereof designed to perform the functions described in the present disclosure.

The communications manager 615, or its sub-components, may be physically located at various positions, including being distributed such that portions of functions are implemented at different physical locations by one or more physical components. In some examples, the communications manager 615, or its sub-components, may be a separate and distinct component in accordance with various aspects of the present disclosure. In some examples, the communications manager 615, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 620 may transmit signals generated by other components of the device 605. In some examples, the transmitter 620 may be collocated with a receiver 610 in a transceiver module. For example, the transmitter 620 may be an example of aspects of the transceiver 920 described with reference to FIG. 9. The transmitter 620 may utilize a single antenna or a set of antennas.

The communications manager 615 as described herein may be implemented to realize one or more potential advantages. One implementation may allow the device 605 to improve the spectral efficiency and reduce the overhead associated with a two-step random access procedure, which may result in fewer transmissions (e.g., or retransmissions) of a preamble portion or a payload portion of the random access procedure.

Based on techniques for improving spectral efficiency and reducing signaling overhead as described herein, a processor of the device 605 may increase system efficiency and decrease the number of processing operations the device 605 may perform. Accordingly, in some examples, the device 605 may experience improved power savings and increased battery life.

Figure 7:
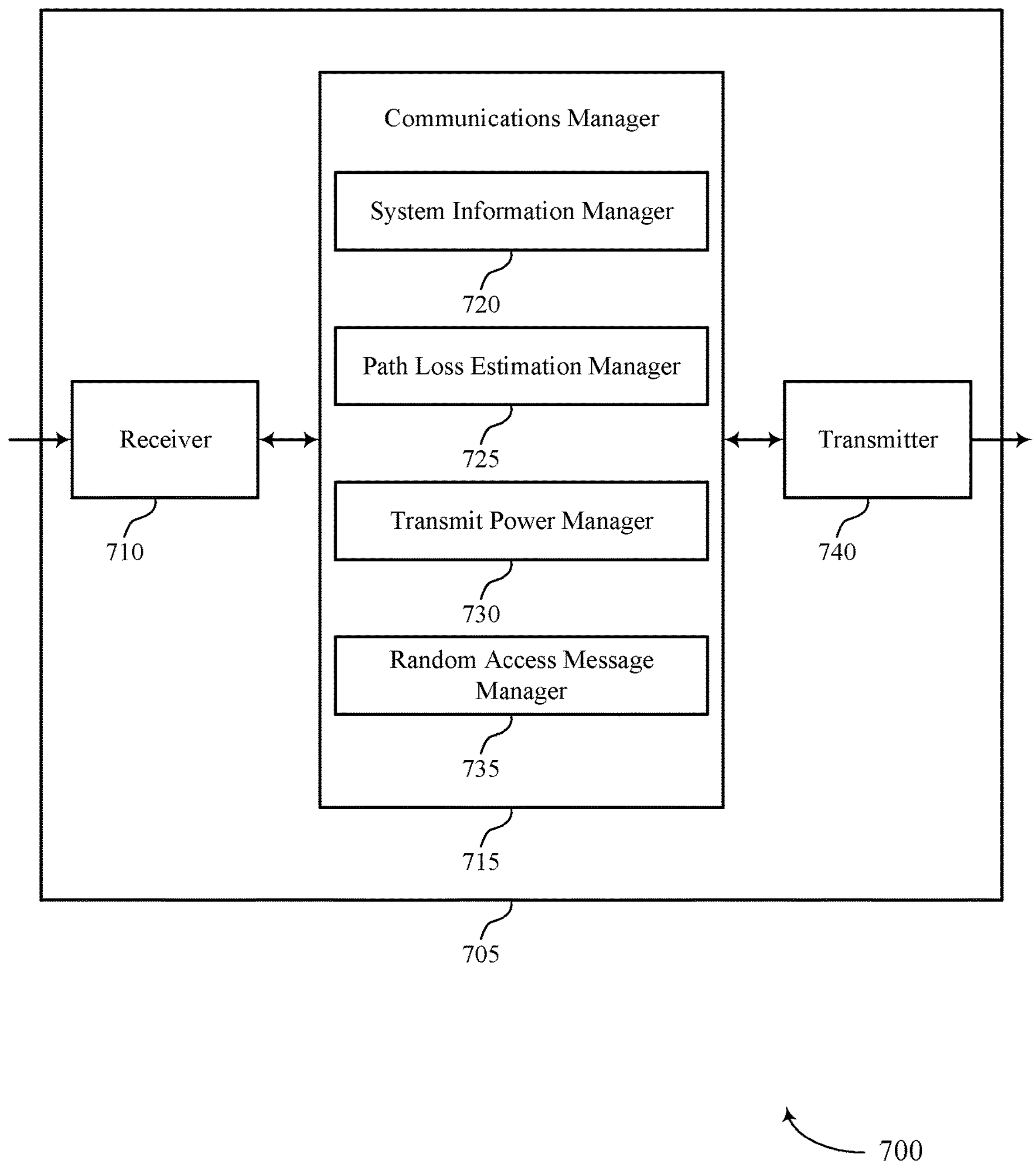

FIG. 7 shows a block diagram 700 of a device 705 that supports open loop power control for two-step random access in accordance with aspects of the present disclosure. The device 705 may be an example of aspects of a device 605, or a UE 115 as described herein. The device 705 may include a receiver 710, a communications manager 715, and a transmitter 740. The device 705 may also include a processor. Each of these components may be in communication with one another (e.g., via one or more buses).

The receiver 710 may receive information such as packets, user data, or control information associated with various information channels (e.g., control channels, data channels, and information related to open loop power control for two-step random access, etc.). Information may be passed on to other components of the device 705. The receiver 710 may be an example of aspects of the transceiver 920 described with reference to FIG. 9. The receiver 710 may utilize a single antenna or a set of antennas.

The communications manager 715 may be an example of aspects of the communications manager 615 as described herein. The communications manager 715 may include a system information manager 720, a path loss estimation manager 725, a transmit power manager 730, and a random access message manager 735. The communications manager 715 may be an example of aspects of the communications manager 910 described herein.

The system information manager 720 may obtain system information received from a base station, the system information including an indication of at least one configuration rule for power control parameter setting for random access.

The path loss estimation manager 725 may estimate a path loss of wireless communications between the base station and the UE based on one or more reference signals.

The transmit power manager 730 may select, based on the estimated path loss and the at least one configuration rule for power control parameter setting, a first transmit power for a first portion of a random access message and a second transmit power for a second portion of the random access message.

The random access message manager 735 may output the first portion of the random access message and the second portion of the random access message for transmission according to the first transmit power and the second transmit power.

The transmitter 740 may transmit signals generated by other components of the device 705. In some examples, the transmitter 740 may be collocated with a receiver 710 in a transceiver module. For example, the transmitter 740 may be an example of aspects of the transceiver 920 described with reference to FIG. 9. The transmitter 740 may utilize a single antenna or a set of antennas.

Figure 8:
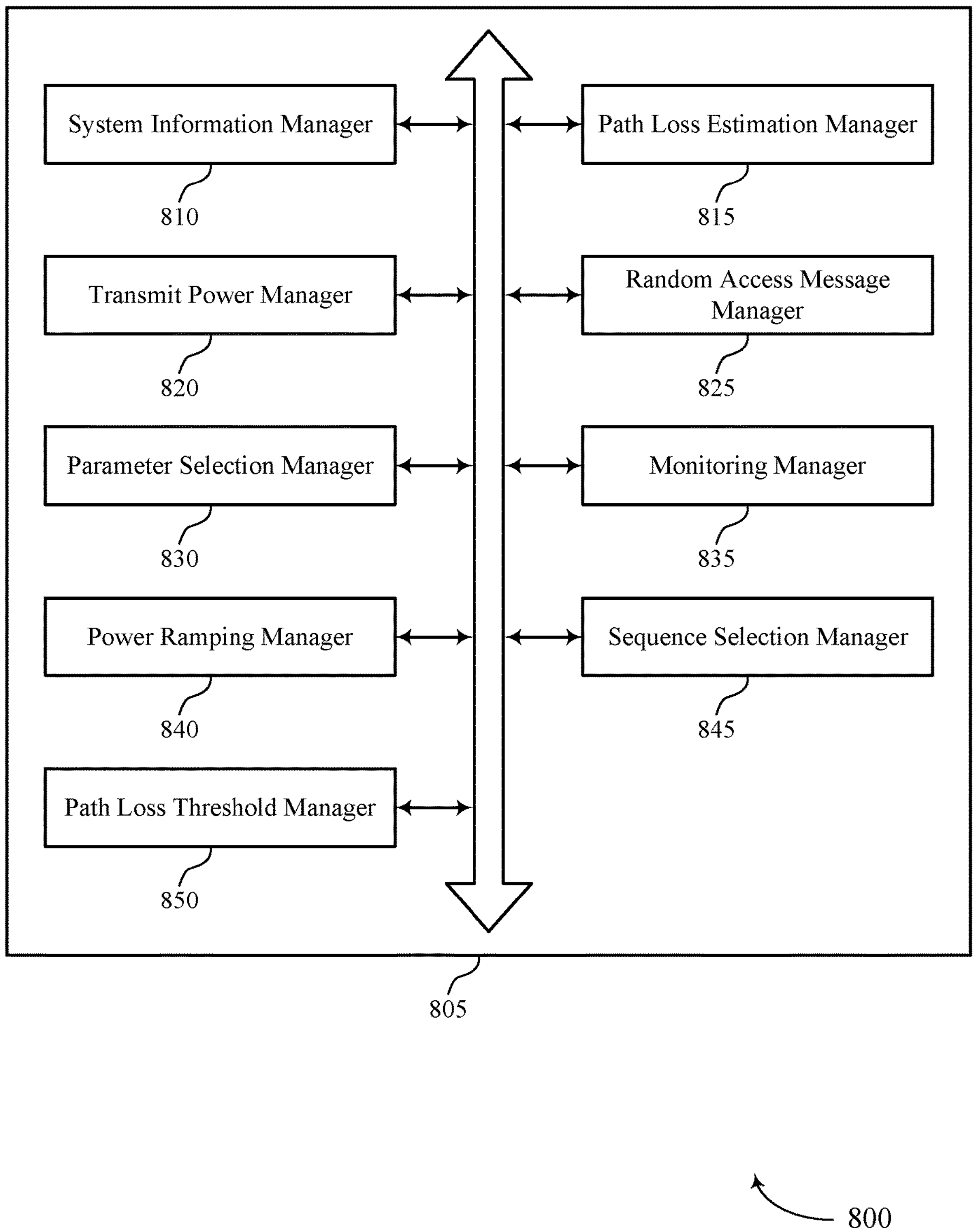
FIG. 8 shows a block diagram of a communications manager that supports open loop power control for two-step random access in accordance with aspects of the present disclosure.

FIG. 8 shows a block diagram 800 of a communications manager 805 that supports open loop power control for two-step random access in accordance with aspects of the present disclosure. The communications manager 805 may be an example of aspects of a communications manager 615, a communications manager 715, or a communications manager 910 described herein. The communications manager 805 may include a system information manager 810, a path loss estimation manager 815, a transmit power manager 820, a random access message manager 825, a parameter selection manager 830, a monitoring manager 835, a power ramping manager 840, a sequence selection manager 845, and a path loss threshold manager 850. Each of these modules may communicate, directly or indirectly, with one another (e.g., via one or more buses).

The system information manager 810 may obtain system information received from a base station, the system information including an indication of at least one configuration rule for power control parameter setting for random access. In some cases, the system information is received via an MIB, an RMSI message, an SIB, or a combination thereof.

The path loss estimation manager 815 may estimate a path loss of wireless communications between the base station and the UE based on one or more reference signals. In some examples, the path loss estimation manager 815 may obtain an indication of a set of reference signal types on which to perform measurements based on the system information received from the base station. In some examples, the path loss estimation manager 815 may perform the measurements on the set of reference signal types based on the obtained indication, where estimating the path loss is based on a combination of the measurements.

In some examples, the path loss estimation manager 815 may estimate the path loss based on an average value of the performed measurements. In some examples, the path loss estimation manager 815 may obtain, based on the system information received from the base station, a set of weighted values corresponding to the set of reference signal types. In some examples, the path loss estimation manager 815 may apply the set of weighted values to the performed measurements. In some examples, the path loss estimation manager 815 may estimate the path loss based on the weighted performed measurements.

In some examples, the path loss estimation manager 815 may identify a first component carrier and a second component carrier, where the set of reference signal types are received on the first component carrier. In some examples, the path loss estimation manager 815 may receive a second set of reference signals on the second component carrier. In some examples, the path loss estimation manager 815 may perform a second set of measurements on the second set of reference signals. In some examples, the path loss estimation manager 815 may estimate the path loss on the first component carrier based on the second set of measurements. In some cases, the set of reference signal types includes an SSB, an SIB, a PRS, a CSI-RS, or a combination thereof.

The transmit power manager 820 may select, based on the estimated path loss and the at least one configuration rule for power control parameter setting, a first transmit power for a first portion of a random access message and a second transmit power for a second portion of the random access message. In some examples, the transmit power manager 820 may identify a first bandwidth and a first numerology for the first portion of the random access message and a second bandwidth and a second numerology for the second portion of the random access message, where selecting the first transmit power and the second transmit power is based on the first bandwidth and the second bandwidth.

In some examples, the transmit power manager 820 may identify a first beam corresponding to the first portion of the random access message and a second beam corresponding to the second portion of the random access message, where selecting the first transmit power and the second transmit power is based on a beamforming scheme of the first beam and a beamforming scheme of the second beam. In some examples, the transmit power manager 820 may identify a payload size or an MCS of the second portion of the random access message, where selecting the second transmit power is based on the identified payload size or the MCS of the second portion of the random access message. In some examples, the transmit power manager 820 may identify an RRC state for the UE, where identifying the payload size of the second portion of the random access message is based on the identified RRC state.

The random access message manager 825 may output the first portion of the random access message and the second portion of the random access message for transmission according to the first transmit power and the second transmit power. In some examples, the random access message manager 825 may select, based on the estimated path loss, a first set of resources for transmitting the first portion of the random access message and a second set of resources for transmitting the second portion of the random access message, where the first set of resources corresponds to a group of UEs, and where the second set of resources corresponds to one of a first subset of UEs from the group of UEs, and the second set of resources corresponds to a second subset of UEs from the group of UEs. In some examples, the random access message manager 825 may select a sequence for transmitting the first portion of the random access message based on the estimated path loss and the first set of resources.

The parameter selection manager 830 may select a first path loss compensation factor value of the set of path loss compensation factor values for the first portion of the random access message and a second path loss compensation factor value of the set of path loss compensation factor values for the second portion of the random access message, the selecting based on the estimated path loss, where selecting the first transmit power is based on the first path loss compensation factor value and selecting the second transmit power is based on the second path loss compensation factor value.

In some examples, the parameter selection manager 830 may select a first target received power value for the first portion of the random access message and select a second target received power value for the second portion of the random access message, based on the set of target received power values, where selecting the first transmit power is based on the first target received power value and selecting the second transmit power is based on the second target received power value. In some cases, the first path loss compensation factor value is different than the second path loss compensation factor value. In some cases, the first target received power value is different than the second target received power value.

The monitoring manager 835 may monitor, based on the random access message, for a response message from the base station. In some examples, the monitoring manager 835 may determine, based on the monitoring, that the random access message has failed.

The power ramping manager 840 may initiate, based on the configuration rule for power control parameter setting and the determining, a first power ramping procedure for the first portion of the random access message and a second power ramping procedure for the second portion of the random access message.

The sequence selection manager 845 may select the sequence for transmitting the first portion of the random access message is based on a comparison of the estimated path loss to a threshold.

The path loss threshold manager 850 may obtain the threshold based on the system information received from the base station.

In some examples, the path loss threshold manager 850 may select the first set of resources and the second set of resources is based on a comparison of the estimated path loss to a threshold. In some cases, each UE of the first subset of UEs has a first path loss that satisfies the threshold, and where each UE of the second subset of UEs has a second path loss that does not satisfy the threshold.

Figure 9:
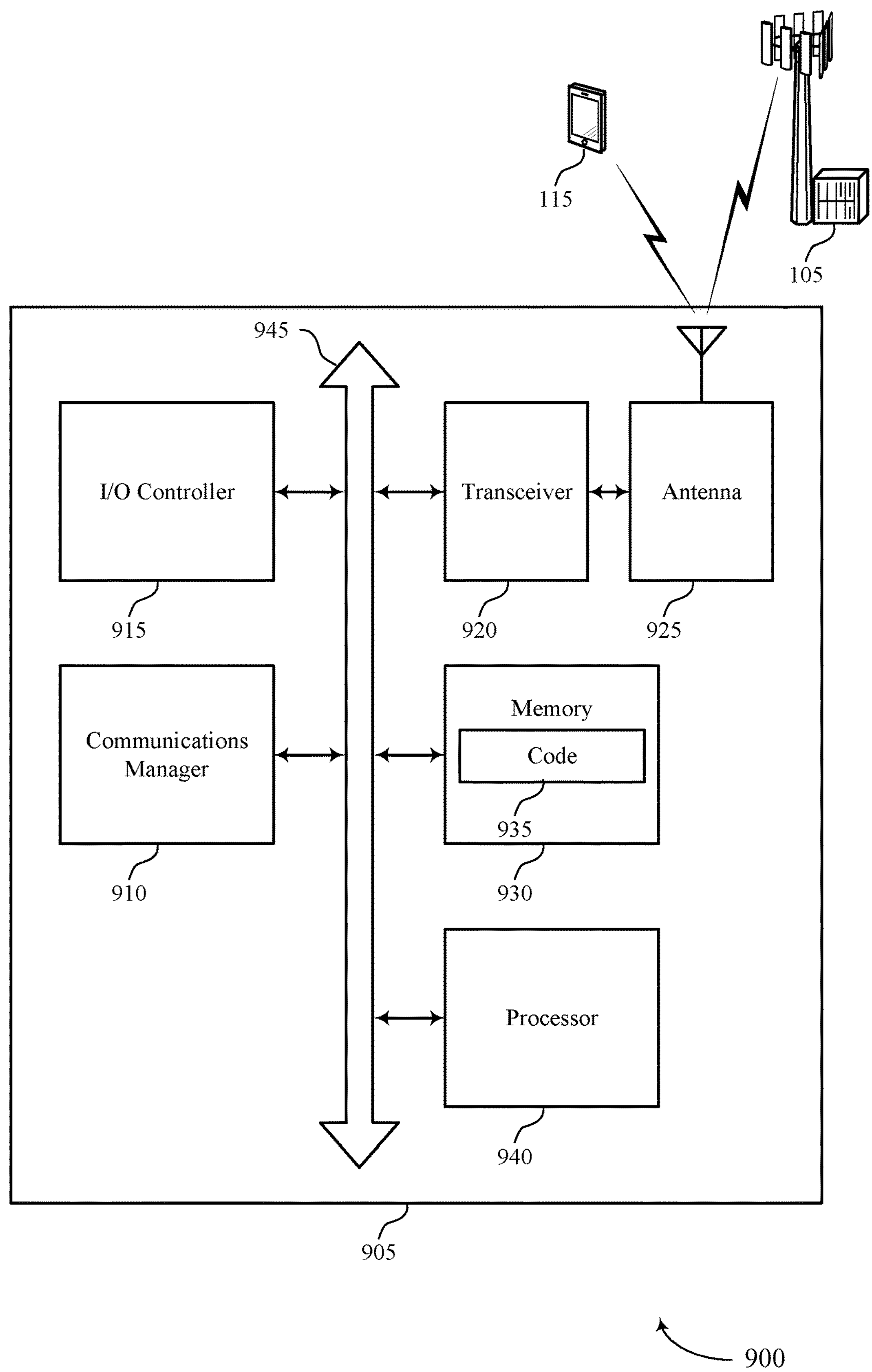
FIG. 9 shows a diagram of a system including a device that supports open loop power control for two-step random access in accordance with aspects of the present disclosure.

FIG. 9 shows a diagram of a system 900 including a device 905 that supports open loop power control for two-step random access in accordance with aspects of the present disclosure. The device 905 may be an example of or include the components of device 605, device 705, or a UE 115 as described herein. The device 905 may include components for bi-directional voice and data communications including components for transmitting and receiving communications, including a communications manager 910, an I/O controller 915, a transceiver 920, an antenna 925, memory 930, and a processor 940. These components may be in electronic communication via one or more buses (e.g., bus 945).

The communications manager 910 may obtain system information received from a base station, the system information including an indication of at least one configuration rule for power control parameter setting for random access, estimate a path loss of wireless communications between the base station and the UE based on one or more reference signals, select, based on the estimated path loss and the at least one configuration rule for power control parameter setting, a first transmit power for a first portion of a random access message and a second transmit power for a second portion of the random access message, and output the first portion of the random access message and the second portion of the random access message for transmission according to the first transmit power and the second transmit power.

The I/O controller 915 may manage input and output signals for the device 905. The I/O controller 915 may also manage peripherals not integrated into the device 905. In some cases, the I/O controller 915 may represent a physical connection or port to an external peripheral. In some cases, the I/O controller 915 may utilize an operating system such as iOS®, ANDROID®, MS-DOS®, MS-WINDOWS®, OS/2®, UNIX®, LINUX®, or another known operating system. In other cases, the I/O controller 915 may represent or interact with a modem, a keyboard, a mouse, a touchscreen, or a similar device. In some cases, the I/O controller 915 may be implemented as part of a processor. In some cases, a user may interact with the device 905 via the I/O controller 915 or via hardware components controlled by the I/O controller 915.

The transceiver 920 may communicate bi-directionally, via one or more antennas, wired, or wireless links as described above. For example, the transceiver 920 may represent a wireless transceiver and may communicate bi-directionally with another wireless transceiver. The transceiver 920 may also include a modem to modulate the packets and provide the modulated packets to the antennas for transmission, and to demodulate packets received from the antennas.

In some cases, the wireless device may include a single antenna 925. However, in some cases the device may have more than one antenna 925, which may be capable of concurrently transmitting or receiving multiple wireless transmissions.

The memory 930 may include random-access memory (RAM) and read-only memory (ROM). The memory 930 may store computer-readable, computer-executable code 935 including instructions that, when executed, cause the processor to perform various functions described herein. In some cases, the memory 930 may contain, among other things, a basic I/O system (BIOS) which may control basic hardware or software operation such as the interaction with peripheral components or devices.

The processor 940 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof).

In some cases, the processor 940 may be configured to operate a memory array using a memory controller. In other cases, a memory controller may be integrated into the processor 940. The processor 940 may be configured to execute computer-readable instructions stored in a memory (e.g., the memory 930) to cause the device 905 to perform various functions (e.g., functions or tasks supporting open loop power control for two-step random access).

The code 935 may include instructions to implement aspects of the present disclosure, including instructions to support wireless communications. The code 935 may be stored in a non-transitory computer-readable medium such as system memory or other type of memory. In some cases, the code 935 may not be directly executable by the processor 940 but may cause a computer (e.g., when compiled and executed) to perform functions described herein.

Figure 10:
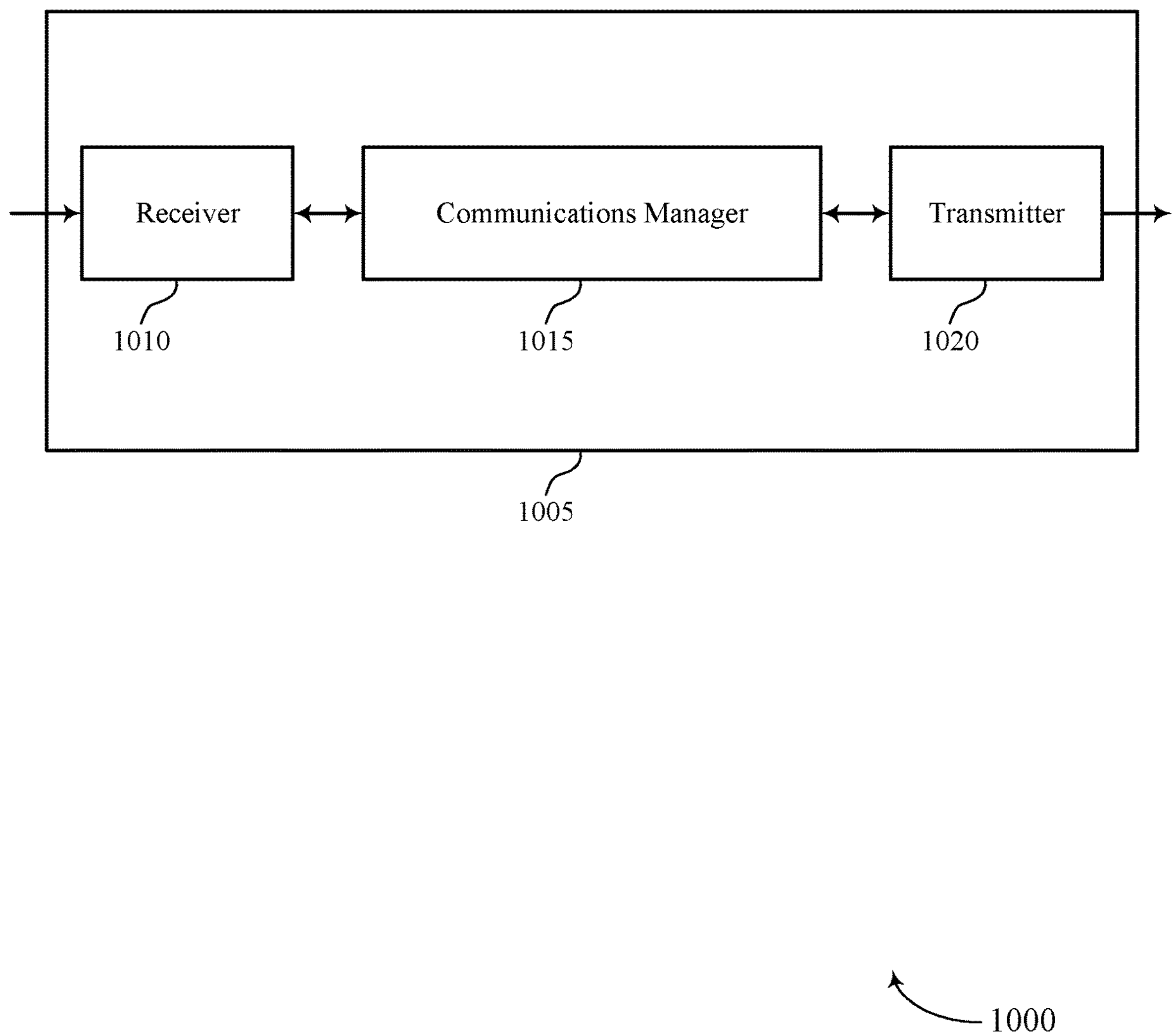
FIGS. 10 and 11 show block diagrams of devices that support open loop power control for two-step random access in accordance with aspects of the present disclosure.

FIG. 10 shows a block diagram 1000 of a device 1005 that supports open loop power control for two-step random access in accordance with aspects of the present disclosure. The device 1005 may be an example of aspects of a base station 105 as described herein. The device 1005 may include a receiver 1010, a communications manager 1015, and a transmitter 1020. The device 1005 may also include a processor. Each of these components may be in communication with one another (e.g., via one or more buses).

The receiver 1010 may receive information such as packets, user data, or control information associated with various information channels (e.g., control channels, data channels, and information related to open loop power control for two-step random access, etc.). Information may be passed on to other components of the device 1005. The receiver 1010 may be an example of aspects of the transceiver 1320 described with reference to FIG. 13. The receiver 1010 may utilize a single antenna or a set of antennas.

The communications manager 1015 may configure at least one configuration rule for power control parameter setting for random access signaling from a UE, output system information for transmission to the UE, the system information including an indication of the at least one configuration rule for power control parameter setting for random access, and obtain a random access message received from the UE, the random access message having a first portion and a second portion, where the first portion of the random access message is obtained according to a first transmit power and the second portion of the random access message is obtained according to a second transmit power. The communications manager 1015 may be an example of aspects of the communications manager 1310 described herein.

The communications manager 1015, or its sub-components, may be implemented in hardware, code (e.g., software or firmware) executed by a processor, or any combination thereof. If implemented in code executed by a processor, the functions of the communications manager 1015, or its sub-components may be executed by a general-purpose processor, a DSP, an ASIC, an FPGA or other programmable logic device, discrete gate or transistor logic, discrete hardware components, or any combination thereof designed to perform the functions described in the present disclosure.

The communications manager 1015, or its sub-components, may be physically located at various positions, including being distributed such that portions of functions are implemented at different physical locations by one or more physical components. In some examples, the communications manager 1015, or its sub-components, may be a separate and distinct component in accordance with various aspects of the present disclosure. In some examples, the communications manager 1015, or its sub-components, may be combined with one or more other hardware components, including but not limited to an I/O component, a transceiver, a network server, another computing device, one or more other components described in the present disclosure, or a combination thereof in accordance with various aspects of the present disclosure.

The transmitter 1020 may transmit signals generated by other components of the device 1005. In some examples, the transmitter 1020 may be collocated with a receiver 1010 in a transceiver module. For example, the transmitter 1020 may be an example of aspects of the transceiver 1320 described with reference to FIG. 13. The transmitter 1020 may utilize a single antenna or a set of antennas.

Figure 11:
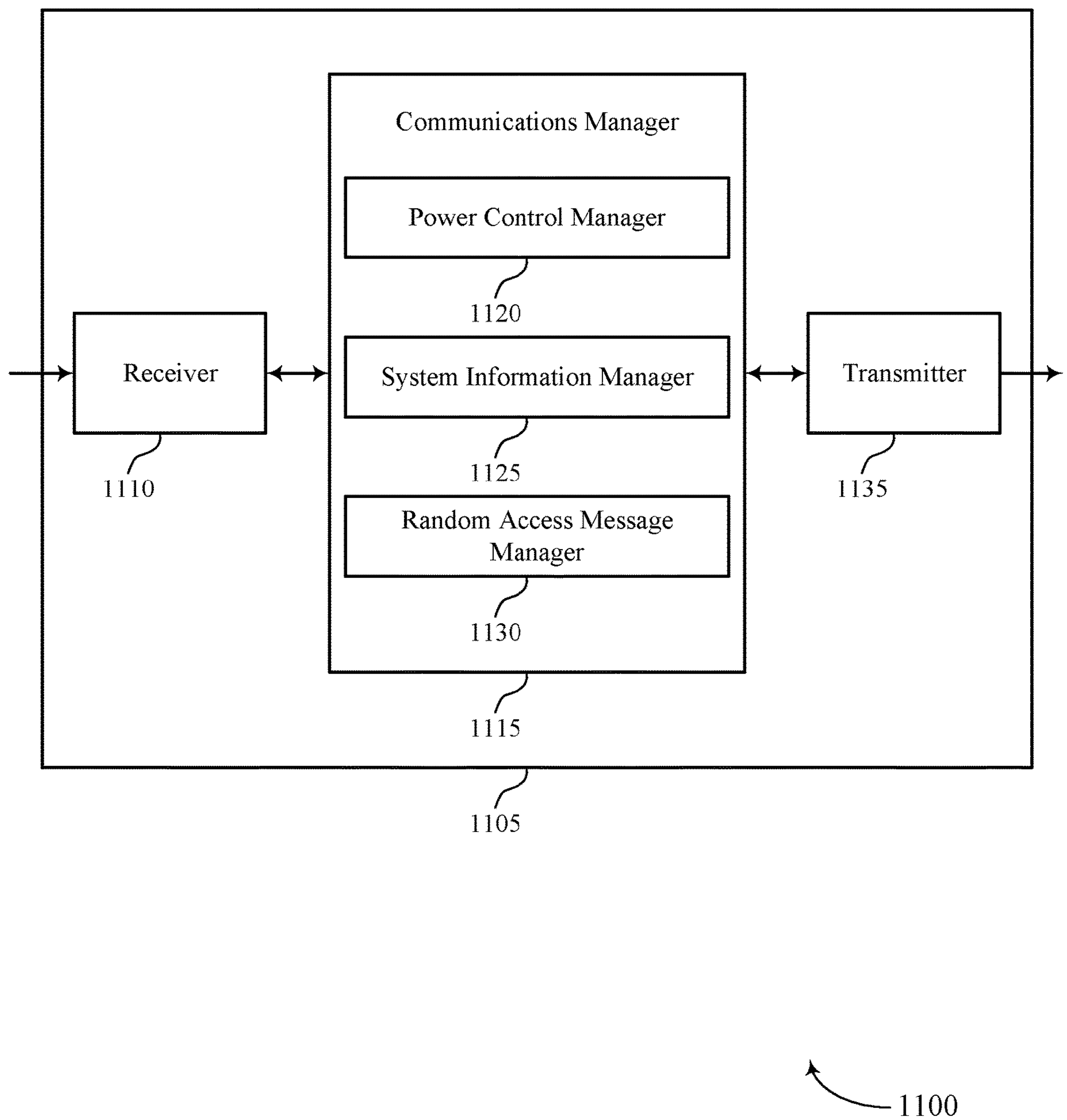

FIG. 11 shows a block diagram 1100 of a device 1105 that supports open loop power control for two-step random access in accordance with aspects of the present disclosure. The device 1105 may be an example of aspects of a device 1005, or a base station 105 as described herein. The device 1105 may include a receiver 1110, a communications manager 1115, and a transmitter 1135. The device 1105 may also include a processor. Each of these components may be in communication with one another (e.g., via one or more buses).

The receiver 1110 may receive information such as packets, user data, or control information associated with various information channels (e.g., control channels, data channels, and information related to open loop power control for two-step random access, etc.). Information may be passed on to other components of the device 1105. The receiver 1110 may be an example of aspects of the transceiver 1320 described with reference to FIG. 13. The receiver 1110 may utilize a single antenna or a set of antennas.

The communications manager 1115 may be an example of aspects of the communications manager 1015 as described herein. The communications manager 1115 may include a power control manager 1120, a system information manager 1125, and a random access message manager 1130. The communications manager 1115 may be an example of aspects of the communications manager 1310 described herein.

The power control manager 1120 may configure at least one configuration rule for power control parameter setting for random access signaling from a UE.

The system information manager 1125 may output system information for transmission to the UE, the system information including an indication of the at least one configuration rule for power control parameter setting for random access.

The random access message manager 1130 may obtain a random access message received from the UE, the random access message having a first portion and a second portion, where the first portion of the random access message is obtained according to a first transmit power and the second portion of the random access message is obtained according to a second transmit power.

The transmitter 1135 may transmit signals generated by other components of the device 1105. In some examples, the transmitter 1135 may be collocated with a receiver 1110 in a transceiver module. For example, the transmitter 1135 may be an example of aspects of the transceiver 1320 described with reference to FIG. 13. The transmitter 1135 may utilize a single antenna or a set of antennas.

Figure 12:
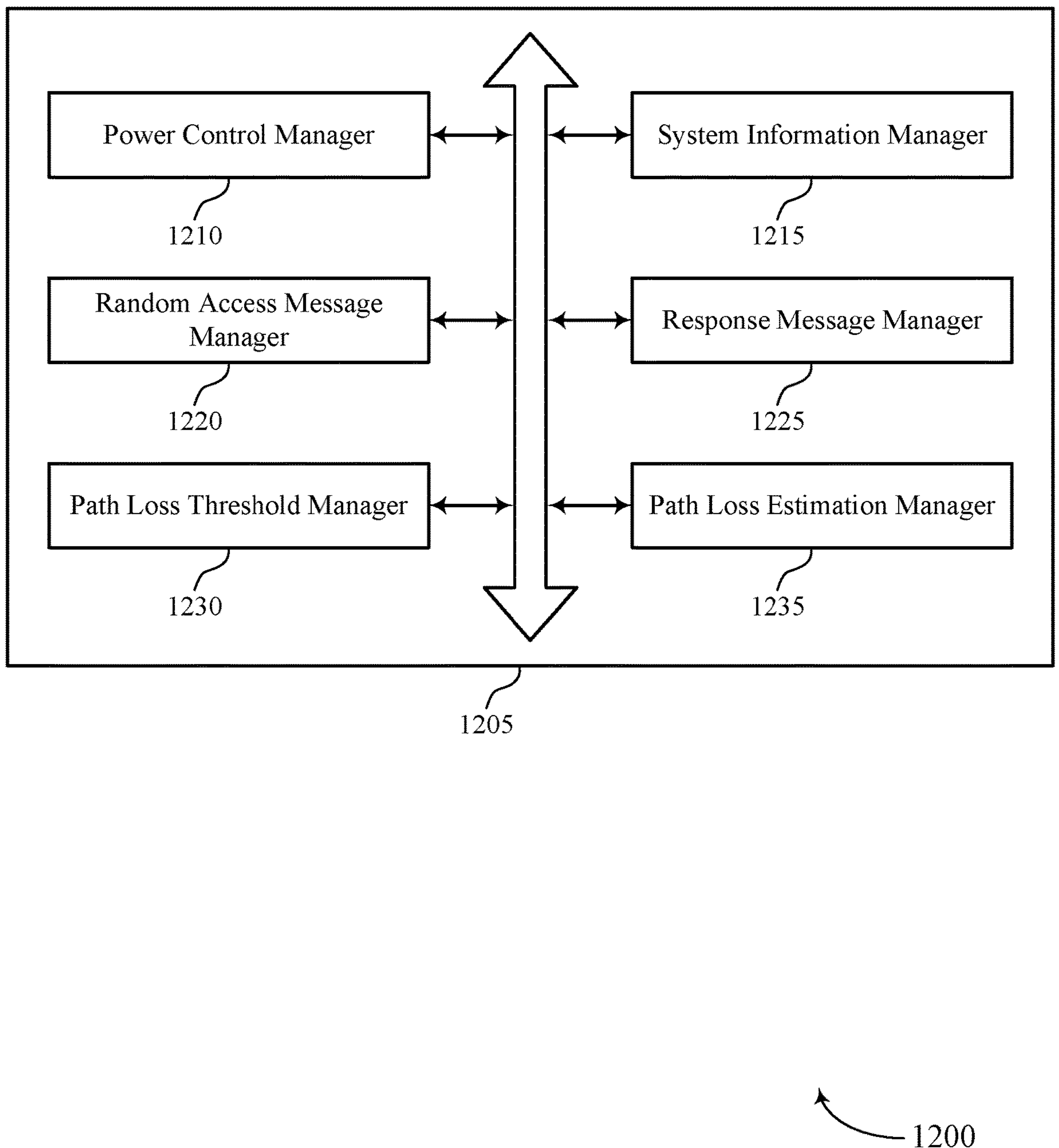
FIG. 12 shows a block diagram of a communications manager that supports open loop power control for two-step random access in accordance with aspects of the present disclosure.

FIG. 12 shows a block diagram 1200 of a communications manager 1205 that supports open loop power control for two-step random access in accordance with aspects of the present disclosure. The communications manager 1205 may be an example of aspects of a communications manager 1015, a communications manager 1115, or a communications manager 1310 described herein. The communications manager 1205 may include a power control manager 1210, a system information manager 1215, a random access message manager 1220, a response message manager 1225, a path loss threshold manager 1230, and a path loss estimation manager 1235. Each of these modules may communicate, directly or indirectly, with one another (e.g., via one or more buses).

The power control manager 1210 may configure at least one configuration rule for power control parameter setting for random access signaling from a UE. In some cases, the at least one configuration rule for power control parameter setting indicates a set of path loss compensation factor values. In some cases, the at least one configuration rule for power control parameter setting indicates a set of target received power values.

The system information manager 1215 may output system information for transmission to the UE, the system information including an indication of the at least one configuration rule for power control parameter setting for random access.

In some cases, the system information is received via an MIB, an RMSI message, an SIB, or a combination thereof.

The random access message manager 1220 may obtain a random access message received from the UE, the random access message having a first portion and a second portion, where the first portion of the random access message is obtained according to a first transmit power and the second portion of the random access message is obtained according to a second transmit power. In some examples, the random access message manager 1220 may obtain the first portion of the random access message over a first set of resources. In some examples, the random access message manager 1220 may obtain the second portion of the random access message over a second set of resources, where the first set of resources corresponds to a group of UEs, and where the second set of resources corresponds to one of a first subset of UEs from the group of UEs, and the second set of resources corresponds to a second subset of UEs from the group of UEs.

The response message manager 1225 may output, for transmission to the UE, a response message for the successfully decoded random access message within a preconfigured time window.

The path loss threshold manager 1230 may output, for transmission to the UE in the system information, a path loss threshold, where the first portion of the random access message and the second portion of the random access message are received over the first set of resources and the second set of resources based on whether a path loss between the base station and the UE satisfies the path loss threshold. In some cases, each UE of the first subset of UEs has a first path loss that satisfies the path loss threshold, and where each UE of the second subset of UEs has a second path loss that does not satisfy the path loss threshold.

The path loss estimation manager 1235 may configure a set of reference signal types on which the UE may perform measurements. In some examples, the path loss estimation manager 1235 may output, for transmission to the UE, an indication of the set of reference signal types in the system information. In some examples, the path loss estimation manager 1235 may output, for transmission to the UE in the system information, a set of weighted values corresponding to the set of reference signal types. In some cases, the set of reference signal types includes an SSB, an SIB, a downlink PRS, a CSI-RS, or a combination thereof.

Figure 13:
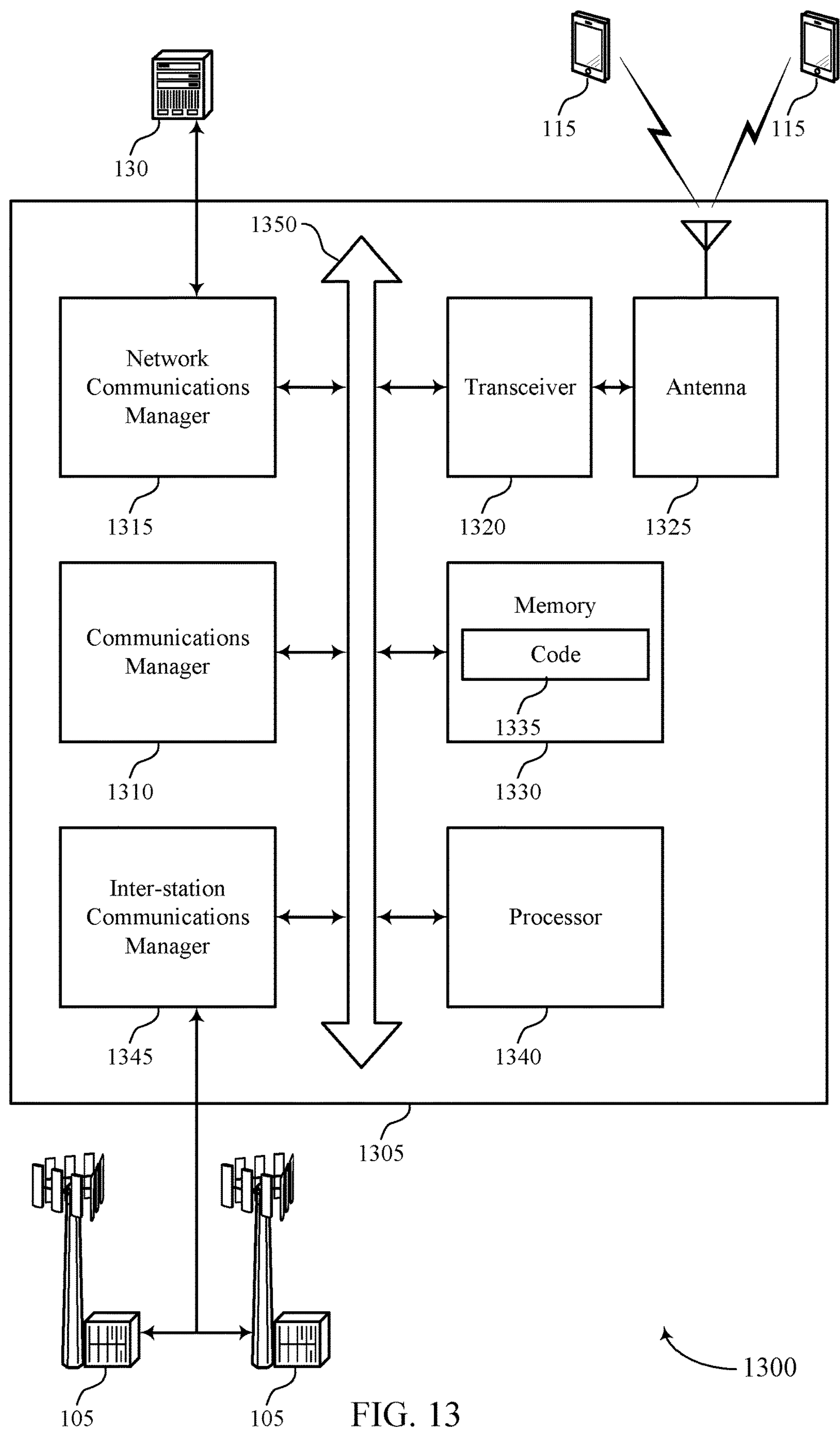
FIG. 13 shows a diagram of a system including a device that supports open loop power control for two-step random access in accordance with aspects of the present disclosure.

FIG. 13 shows a diagram of a system 1300 including a device 1305 that supports open loop power control for two-step random access in accordance with aspects of the present disclosure. The device 1305 may be an example of or include the components of device 1005, device 1105, or a base station 105 as described herein. The device 1305 may include components for bi-directional voice and data communications including components for transmitting and receiving communications, including a communications manager 1310, a network communications manager 1315, a transceiver 1320, an antenna 1325, memory 1330, a processor 1340, and an inter-station communications manager 1345. These components may be in electronic communication via one or more buses (e.g., bus 1350).

The communications manager 1310 may configure at least one configuration rule for power control parameter setting for random access signaling from a UE, output system information for transmission to the UE, the system information including an indication of the at least one configuration rule for power control parameter setting for random access, and obtain a random access message received from the UE, the random access message having a first portion and a second portion, where the first portion of the random access message is obtained according to a first transmit power and the second portion of the random access message is obtained according to a second transmit power.

The network communications manager 1315 may manage communications with the core network (e.g., via one or more wired backhaul links). For example, the network communications manager 1315 may manage the transfer of data communications for client devices, such as one or more UEs 115.

The transceiver 1320 may communicate bi-directionally, via one or more antennas, wired, or wireless links as described above. For example, the transceiver 1320 may represent a wireless transceiver and may communicate bi-directionally with another wireless transceiver. The transceiver 1320 may also include a modem to modulate the packets and provide the modulated packets to the antennas for transmission, and to demodulate packets received from the antennas.

In some cases, the wireless device may include a single antenna 1325. However, in some cases the device may have more than one antenna 1325, which may be capable of concurrently transmitting or receiving multiple wireless transmissions.

The memory 1330 may include RAM, ROM, or a combination thereof. The memory 1330 may store computer-readable code 1335 including instructions that, when executed by a processor (e.g., the processor 1340) cause the device to perform various functions described herein. In some cases, the memory 1330 may contain, among other things, a BIOS which may control basic hardware or software operation such as the interaction with peripheral components or devices.

The processor 1340 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1340 may be configured to operate a memory array using a memory controller. In some cases, a memory controller may be integrated into processor 1340. The processor 1340 may be configured to execute computer-readable instructions stored in a memory (e.g., the memory 1330) to cause the device 1305 to perform various functions (e.g., functions or tasks supporting open loop power control for two-step random access).

The inter-station communications manager 1345 may manage communications with other base station 105, and may include a controller or scheduler for controlling communications with UEs 115 in cooperation with other base stations 105. For example, the inter-station communications manager 1345 may coordinate scheduling for transmissions to UEs 115 for various interference mitigation techniques such as beamforming or joint transmission. In some examples, the inter-station communications manager 1345 may provide an X2 interface within an LTE/LTE-A wireless communication network technology to provide communication between base stations 105.

The code 1335 may include instructions to implement aspects of the present disclosure, including instructions to support wireless communications. The code 1335 may be stored in a non-transitory computer-readable medium such as system memory or other type of memory. In some cases, the code 1335 may not be directly executable by the processor 1340 but may cause a computer (e.g., when compiled and executed) to perform functions described herein.

Figure 14:
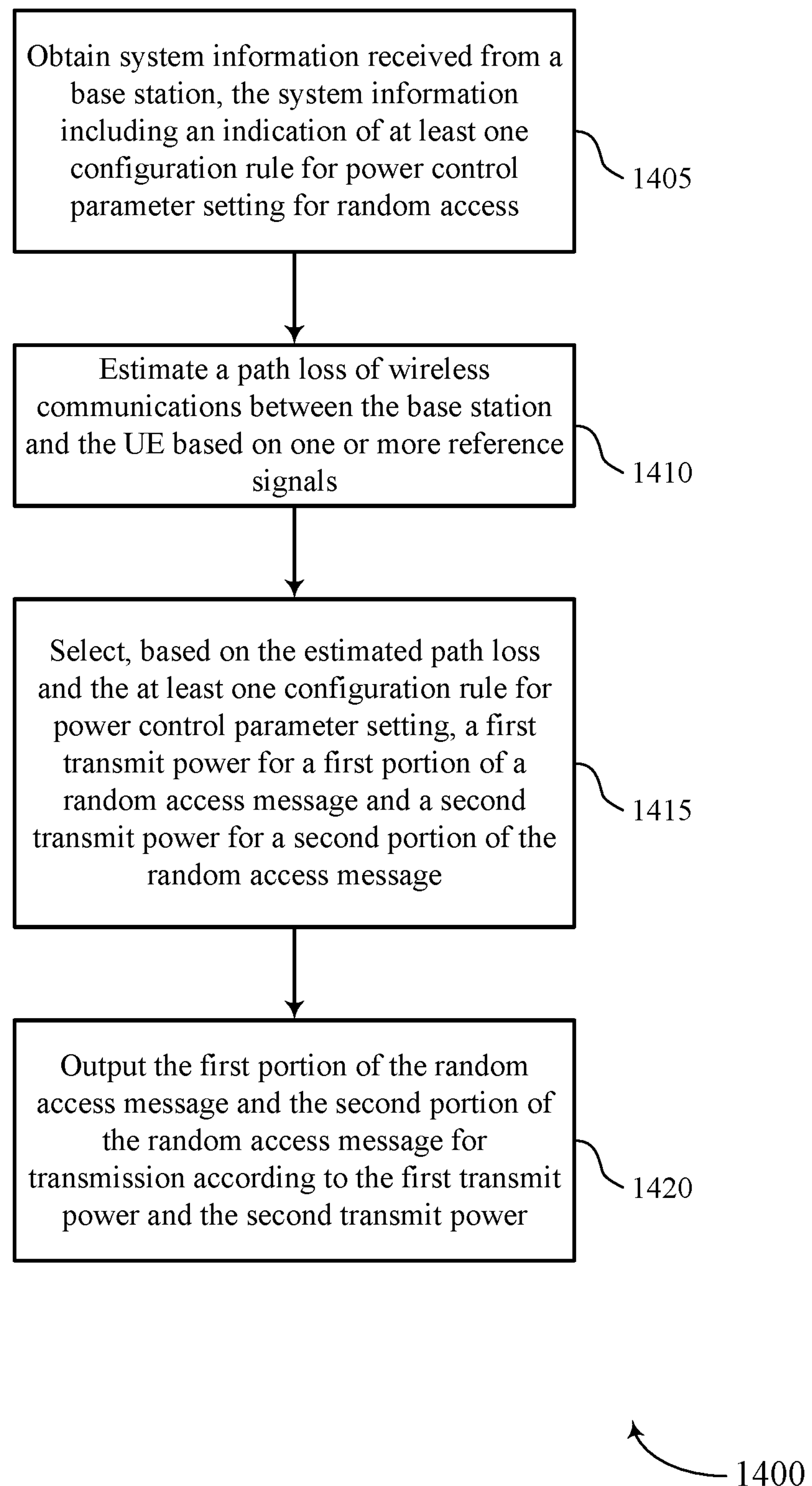
FIGS. 14 through 17 show flowcharts illustrating methods that support open loop power control for two-step random access in accordance with aspects of the present disclosure.

FIG. 14 shows a flowchart illustrating a method 1400 that supports open loop power control for two-step random access in accordance with aspects of the present disclosure. The operations of method 1400 may be implemented by a UE 115 or its components as described herein. For example, the operations of method 1400 may be performed by a communications manager as described with reference to FIGS. 6 through 9. In some examples, a UE may execute a set of instructions to control the functional elements of the UE to perform the functions described below. Additionally or alternatively, a UE may perform aspects of the functions described below using special-purpose hardware.

At 1405, the UE may obtain system information received from a base station, the system information including an indication of at least one configuration rule for power control parameter setting for random access. The operations of 1405 may be performed according to the methods described herein. In some examples, aspects of the operations of 1405 may be performed by a system information manager as described with reference to FIGS. 6 through 9.

At 1410, the UE may estimate a path loss of wireless communications between the base station and the UE based on one or more reference signals. The operations of 1410 may be performed according to the methods described herein. In some examples, aspects of the operations of 1410 may be performed by a path loss estimation manager as described with reference to FIGS. 6 through 9.

At 1415, the UE may select, based on the estimated path loss and the at least one configuration rule for power control parameter setting, a first transmit power for a first portion of a random access message and a second transmit power for a second portion of the random access message. The operations of 1415 may be performed according to the methods described herein. In some examples, aspects of the operations of 1415 may be performed by a transmit power manager as described with reference to FIGS. 6 through 9.

At 1420, the UE may output the first portion of the random access message and the second portion of the random access message for transmission according to the first transmit power and the second transmit power. The operations of 1420 may be performed according to the methods described herein. In some examples, aspects of the operations of 1420 may be performed by a random access message manager as described with reference to FIGS. 6 through 9.

Figure 15:
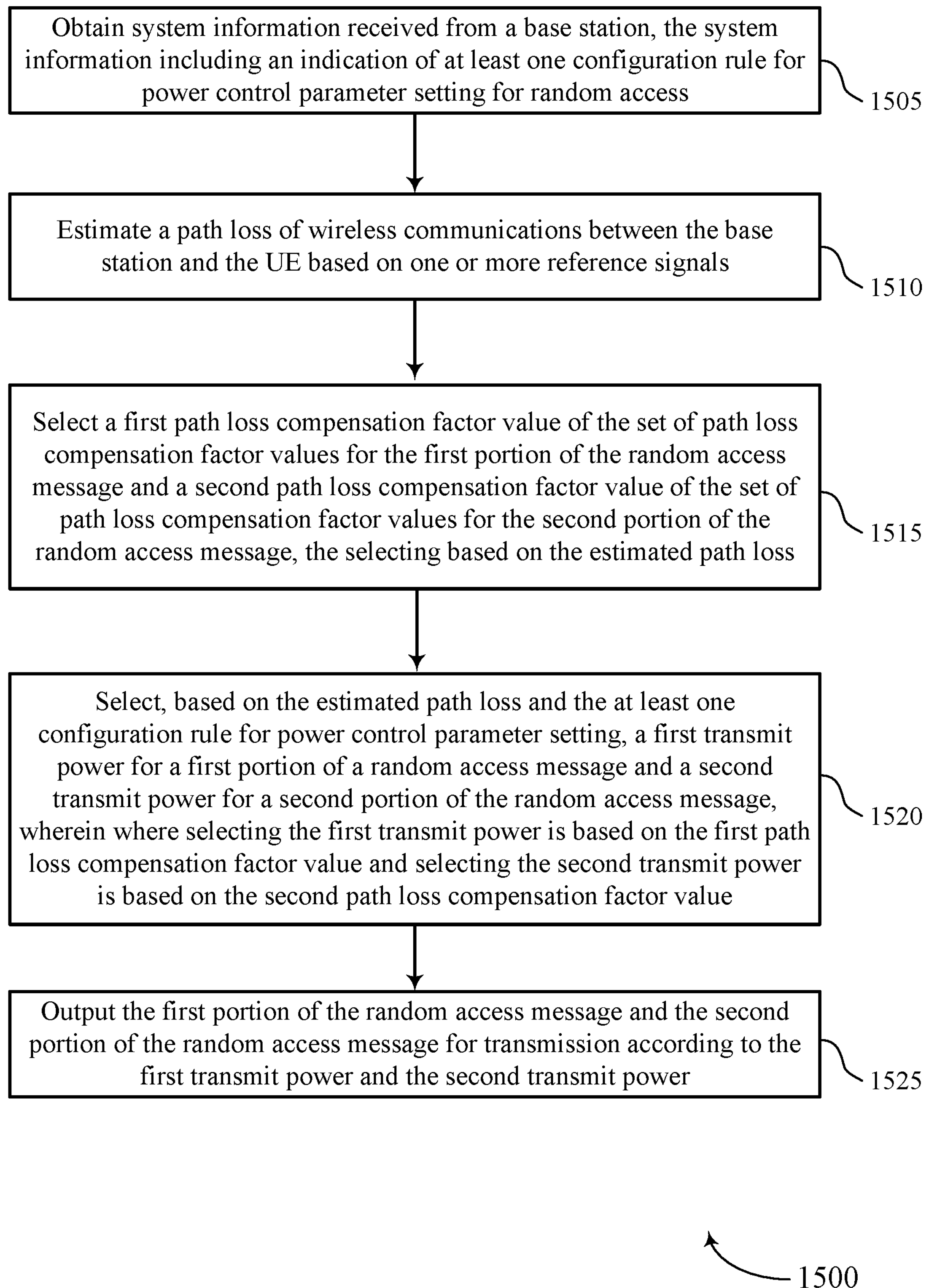

FIG. 15 shows a flowchart illustrating a method 1500 that supports open loop power control for two-step random access in accordance with aspects of the present disclosure. The operations of method 1500 may be implemented by a UE 115 or its components as described herein. For example, the operations of method 1500 may be performed by a communications manager as described with reference to FIGS. 6 through 9. In some examples, a UE may execute a set of instructions to control the functional elements of the UE to perform the functions described below. Additionally or alternatively, a UE may perform aspects of the functions described below using special-purpose hardware.

At 1505, the UE may obtain system information received from a base station, the system information including an indication of at least one configuration rule for power control parameter setting for random access. The operations of 1505 may be performed according to the methods described herein. In some examples, aspects of the operations of 1505 may be performed by a system information manager as described with reference to FIGS. 6 through 9.

At 1510, the UE may estimate a path loss of wireless communications between the base station and the UE based on one or more reference signals. The operations of 1510 may be performed according to the methods described herein. In some examples, aspects of the operations of 1510 may be performed by a path loss estimation manager as described with reference to FIGS. 6 through 9.

At 1515, the UE may select a first path loss compensation factor value of the set of path loss compensation factor values for the first portion of the random access message and a second path loss compensation factor value of the set of path loss compensation factor values for the second portion of the random access message, the selecting based on the estimated path loss. The operations of 1515 may be performed according to the methods described herein. In some examples, aspects of the operations of 1515 may be performed by a parameter selection manager as described with reference to FIGS. 6 through 9.

At 1520, the UE may select, based on the estimated path loss and the at least one configuration rule for power control parameter setting, a first transmit power for a first portion of a random access message and a second transmit power for a second portion of the random access message, where selecting the first transmit power is based on the first path loss compensation factor value and selecting the second transmit power is based on the second path loss compensation factor value. The operations of 1520 may be performed according to the methods described herein. In some examples, aspects of the operations of 1520 may be performed by a transmit power manager as described with reference to FIGS. 6 through 9.

At 1525, the UE may output the first portion of the random access message and the second portion of the random access message for transmission according to the first transmit power and the second transmit power. The operations of 1525 may be performed according to the methods described herein. In some examples, aspects of the operations of 1525 may be performed by a random access message manager as described with reference to FIGS. 6 through 9.

Figure 16:
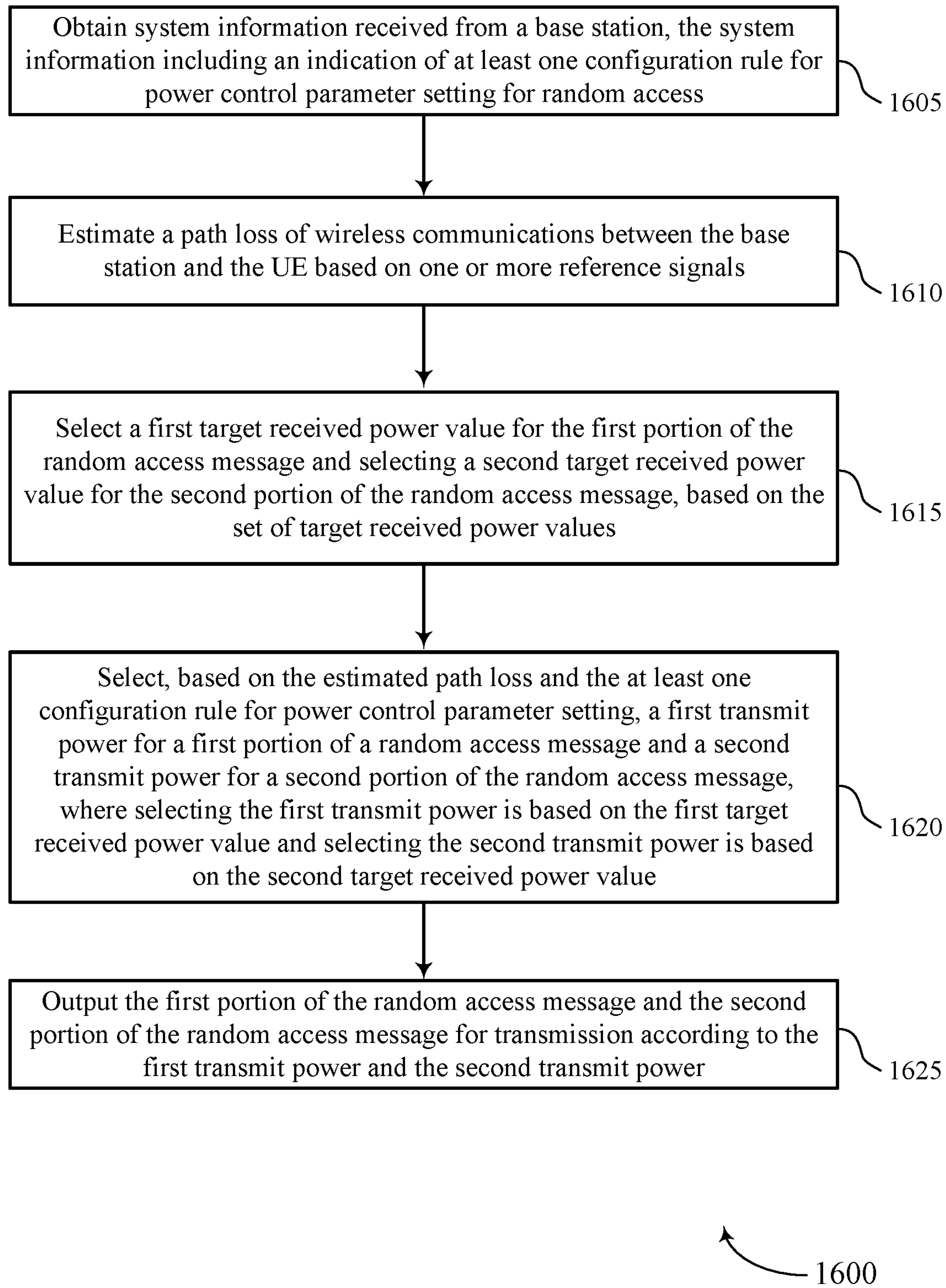

FIG. 16 shows a flowchart illustrating a method 1600 that supports open loop power control for two-step random access in accordance with aspects of the present disclosure. The operations of method 1600 may be implemented by a UE 115 or its components as described herein. For example, the operations of method 1600 may be performed by a communications manager as described with reference to FIGS. 6 through 9. In some examples, a UE may execute a set of instructions to control the functional elements of the UE to perform the functions described below. Additionally or alternatively, a UE may perform aspects of the functions described below using special-purpose hardware.

At 1605, the UE may obtain system information received from a base station, the system information including an indication of at least one configuration rule for power control parameter setting for random access. The operations of 1605 may be performed according to the methods described herein. In some examples, aspects of the operations of 1605 may be performed by a system information manager as described with reference to FIGS. 6 through 9.

At 1610, the UE may estimate a path loss of wireless communications between the base station and the UE based on one or more reference signals. The operations of 1610 may be performed according to the methods described herein. In some examples, aspects of the operations of 1610 may be performed by a path loss estimation manager as described with reference to FIGS. 6 through 9.

At 1615, the UE may select a first target received power value for the first portion of the random access message and select a second target received power value for the second portion of the random access message, based on the set of target received power values. The operations of 1615 may be performed according to the methods described herein. In some examples, aspects of the operations of 1615 may be performed by a parameter selection manager as described with reference to FIGS. 6 through 9.

At 1620, the UE may select, based on the estimated path loss and the at least one configuration rule for power control parameter setting, a first transmit power for a first portion of a random access message and a second transmit power for a second portion of the random access message, where selecting the first transmit power is based on the first target received power value and selecting the second transmit power is based on the second target received power value. The operations of 1620 may be performed according to the methods described herein. In some examples, aspects of the operations of 1620 may be performed by a transmit power manager as described with reference to FIGS. 6 through 9.

At 1625, the UE may output the first portion of the random access message and the second portion of the random access message for transmission according to the first transmit power and the second transmit power. The operations of 1625 may be performed according to the methods described herein. In some examples, aspects of the operations of 1625 may be performed by a random access message manager as described with reference to FIGS. 6 through 9.

Figure 17:
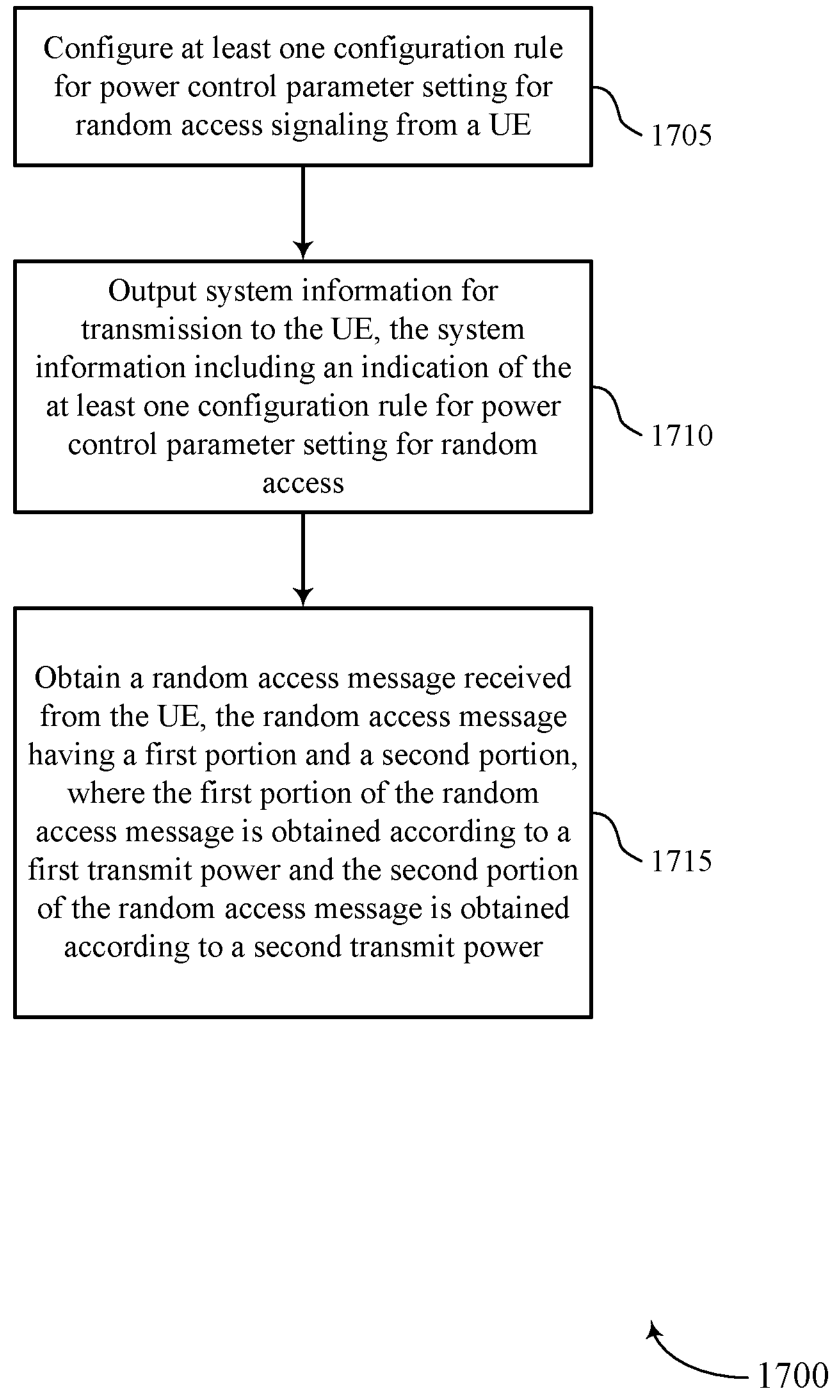

FIG. 17 shows a flowchart illustrating a method 1700 that supports open loop power control for two-step random access in accordance with aspects of the present disclosure. The operations of method 1700 may be implemented by a base station 105 or its components as described herein. For example, the operations of method 1700 may be performed by a communications manager as described with reference to FIGS. 10 through 13. In some examples, a base station may execute a set of instructions to control the functional elements of the base station to perform the functions described below. Additionally or alternatively, a base station may perform aspects of the functions described below using special-purpose hardware.

At 1705, the base station may configure at least one configuration rule for power control parameter setting for random access signaling from a UE. The operations of 1705 may be performed according to the methods described herein. In some examples, aspects of the operations of 1705 may be performed by a power control manager as described with reference to FIGS. 10 through 13.

At 1710, the base station may output system information for transmission to the UE, the system information including an indication of the at least one configuration rule for power control parameter setting for random access. The operations of 1710 may be performed according to the methods described herein. In some examples, aspects of the operations of 1710 may be performed by a system information manager as described with reference to FIGS. 10 through 13.

At 1715, the base station may obtain a random access message received from the UE, the random access message having a first portion and a second portion, where the first portion of the random access message is obtained according to a first transmit power and the second portion of the random access message is obtained according to a second transmit power. The operations of 1715 may be performed according to the methods described herein. In some examples, aspects of the operations of 1715 may be performed by a random access message manager as described with reference to FIGS. 10 through 13.

It should be noted that the methods described herein describe possible implementations, and that the operations and the steps may be rearranged or otherwise modified and that other implementations are possible. Further, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1×, 1×, etc. IS-856 (TIA-856) is commonly referred to as CDMA2000 1×EV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UNITS). LTE, LTE-A, and LTE-A Pro are releases of UMTS that use E-UTRA. UTRA, E-UTRA, UMTS, LTE, LTE-A, LTE-A Pro, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned herein as well as other systems and radio technologies. While aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR applications.

A macro cell generally covers a relatively large geographic area (e.g., several kilometers in radius) and may allow unrestricted access by UEs with service subscriptions with the network provider. A small cell may be associated with a lower-powered base station, as compared with a macro cell, and a small cell may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple component carriers.

The wireless communications systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA, or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communications at a user equipment (UE), comprising:
obtaining system information received from a base station, the system information including an indication of at least one configuration rule for power control parameter setting for random access;
estimating a path loss of wireless communications between the base station and the UE based at least in part on one or more reference signals;
selecting, based at least in part on the estimated path loss and the at least one configuration rule for power control parameter setting, a first transmit power for a physical random access channel portion of a random access message and a second transmit power for a physical uplink shared channel portion of the random access message; and
transmitting the physical random access channel portion of the random access message over a physical random access channel and the physical uplink shared channel portion of the random access message over a physical uplink shared channel according to the first transmit power and the second transmit power, respectively.

2. The method of claim 1, wherein the at least one configuration rule for power control parameter setting indicates a set of path loss compensation factor values, further comprising:
selecting a first path loss compensation factor value of the set of path loss compensation factor values for the physical random access channel portion of the random access message and a second path loss compensation factor value of the set of path loss compensation factor values for the physical uplink shared channel portion of the random access message, wherein selecting the first transmit power is based at least in part on the first path loss compensation factor value and selecting the second transmit power is based at least in part on the second path loss compensation factor value.

3. The method of claim 2, wherein the first path loss compensation factor value is different than the second path loss compensation factor value.

4. The method of claim 1, further comprising:
identifying a first bandwidth and a first numerology for the physical uplink shared channel portion of the random access message, wherein selecting the second transmit power is based at least in part on the first bandwidth.

5. The method of claim 4, further comprising:
identifying a second bandwidth and a second numerology for the physical random access channel portion of the random access message, wherein selecting the first transmit power is based at least in part on the second bandwidth.

6. The method of claim 1, wherein:
identifying a first beam corresponding to the physical random access channel portion of the random access message and a second beam corresponding to the physical uplink shared channel portion of the random access message, wherein selecting the first transmit power and the second transmit power is based at least in part on a first beamforming scheme of the first beam and a second beamforming scheme of the second beam.

7. The method of claim 1, wherein the at least one configuration rule for power control parameter setting indicates a set of target received power values, further comprising:
selecting a first target received power value for the physical random access channel portion of the random access message and selecting a second target received power value for the physical uplink shared channel portion of the random access message, based at least in part on the set of target received power values, wherein selecting the first transmit power is based at least in part on the first target received power value and selecting the second transmit power is based at least in part on the second target received power value.

8. The method of claim 7, wherein the first target received power value is different than the second target received power value.

9. The method of claim 1, further comprising:
identifying a payload size and a modulation and coding scheme (MCS) of the physical uplink shared channel portion of the random access message, wherein selecting the second transmit power is based at least in part on the payload size and the MCS of the physical uplink shared channel portion of the random access message.

10. The method of claim 9, further comprising:
identifying a radio resource control (RRC) state for the UE, wherein identifying the payload size of the physical uplink shared channel portion of the random access message is based at least in part on the identified RRC state.

11. The method of claim 1, further comprising:
monitoring, based at least in part on the random access message, for a response message from the base station;
determining, based at least in part on the monitoring, that at least the physical random access channel portion of the random access message or the physical uplink shared channel portion of the random access message failed; and
initiating, based at least in part on the at least one configuration rule for power control parameter setting and the determining, a power ramping procedure for the physical random access channel portion of the random access message or the physical uplink shared channel portion of the random access message.

12. The method of claim 1, further comprising:
monitoring, based at least in part on the random access message, for a response message from the base station;
determining, based at least in part on the monitoring, that the random access message has failed; and
initiating, based at least in part on the at least one configuration rule for power control parameter setting and the determining, a first power ramping procedure for the physical random access channel portion of the random access message and a second power ramping procedure for the physical uplink shared channel portion of the random access message.

13. The method of claim 1, further comprising:
selecting, based at least in part on the estimated path loss, a first set of resources for transmitting the physical random access channel portion of the random access message and a second set of resources for transmitting the physical uplink shared channel portion of the random access message, wherein the first set of resources corresponds to a group of UEs, and wherein the second set of resources corresponds to one of a first subset of UEs from the group of UEs, and the second set of resources corresponds to a second subset of UEs from the group of UEs.

14. The method of claim 13, further comprising:

selecting a sequence for transmitting the physical random access channel portion of the random access message based at least in part on the estimated path loss and the first set of resources.

15. The method of claim 14, wherein:

selecting the sequence for transmitting the physical random access channel portion of the random access message is based at least in part on a comparison of the estimated path loss to a threshold.

16. The method of claim 15, further comprising:

obtaining the threshold based at least in part on the system information received from the base station.

17. The method of claim 16, wherein each UE of the first subset of UEs has a first path loss that satisfies the threshold, and wherein each UE of the second subset of UEs has a second path loss that does not satisfy the threshold.

18. The method of claim 14, wherein:

selecting the first set of resources and the second set of resources is based at least in part on a comparison of the estimated path loss to a threshold.

19. The method of claim 1, wherein estimating the path loss of wireless communications between the base station and UE based at least in part on the one or more reference signals further comprises:

obtaining an indication of a set of reference signal types on which to perform measurements based at least in part on the system information received from the base station; and performing the measurements on the set of reference signal types based at least in part on the obtained indication, wherein estimating the path loss is based at least in part on a combination of the measurements.

20. The method of claim 19, further comprising:

estimating the path loss based on an average value of the performed measurements.

21. The method of claim 19, further comprising:

obtaining, based at least in part on the system information received from the base station, a set of weighted values corresponding to the set of reference signal types;

applying the set of weighted values to the performed measurements to obtain weighted performed measurements; and estimating the path loss based at least in part on the weighted performed measurements.

22. The method of claim 19, wherein the set of reference signal types includes a synchronization signal block (SSB), a system information block (SIB), a downlink positioning reference signal (PRS), a channel state information reference signal (CSI-RS), or a combination thereof.

23. The method of claim 19, further comprising:

identifying a first component carrier and a second component carrier, wherein the set of reference signal types are received on the first component carrier;

receiving a second set of reference signals on the second component carrier; and performing a second set of measurements on the second set of reference signals, wherein estimating the path loss on the first component carrier is based at least in part on the second set of measurements.

24. The method of claim 1, wherein the system information is received via a master information block (MIB), a remaining minimum system information (RMSI) message, a system information block (SIB), or a combination thereof.

25. A method for wireless communications at a base station, comprising:

configuring at least one configuration rule for power control parameter setting for random access signaling from a user equipment (UE);

transmitting system information to the UE, the system information including an indication of the at least one configuration rule for power control parameter setting for random access; and obtaining a random access message received from the UE, the random access message having a physical random access channel portion and a physical uplink shared channel portion, wherein the physical random access channel portion of the random access message is obtained according to a first transmit power over a physical random access channel and the physical uplink shared channel portion of the random access message is obtained according to a second transmit power over a physical uplink shared channel.

26. The method of claim 25, wherein the at least one configuration rule for power control parameter setting indicates a set of path loss compensation factor values.

27. The method of claim 25, wherein the at least one configuration rule for power control parameter setting indicates a set of target received power values.

28. The method of claim 25, further comprising:

transmitting, to the UE, a response message for a successfully decoded random access message within a preconfigured time window.

29. The method of claim 25, further comprising:

obtaining the physical random access channel portion of the random access message over a first set of resources; and obtaining the physical uplink shared channel portion of the random access message over a second set of resources, wherein the first set of resources corresponds to a group of UEs, and wherein the second set of resources corresponds to one of a first subset of UEs from the group of UEs, and the second set of resources corresponds to a second subset of UEs from the group of UEs.

30. An apparatus for wireless communications at a user equipment (UE), comprising:

a processor, memory coupled with the processor; and instructions stored in the memory and executable by the processor to cause the apparatus to:

obtain system information received from a base station, the system information including an indication of at least one configuration rule for power control parameter setting for random access;

estimate a path loss of wireless communications between the base station and the UE based at least in part on one or more reference signals;

select, based at least in part on the estimated path loss and the at least one configuration rule for power control parameter setting, a first transmit power for a physical random access channel portion of a random access message and a second transmit power for a physical uplink shared channel portion of the random access message; and transmit the physical random access channel portion of the random access message over a physical random access channel and the physical uplink shared channel portion of the random access message over a physical uplink shared channel according to the first transmit power and the second transmit power, respectively.

31. An apparatus for wireless communications at a base station, comprising:

a processor;

memory coupled with the processor; and instructions stored in the memory and executable by the processor to cause the apparatus to:

configure at least one configuration rule for power control parameter setting for random access signaling from a user equipment (UE);

transmit system information to the UE, the system information including an indication of the at least one configuration rule for power control parameter setting for random access; and obtain a random access message received from the UE, the random access message having a physical random access channel portion and a physical uplink shared channel portion, wherein the physical random access channel portion of the random access message is obtained according to a first transmit power over a physical random access channel and the physical uplink shared channel portion of the random access message is obtained according to a second transmit power over a physical uplink shared channel.

* * * * *